United States Patent
Babin

(10) Patent No.: US 11,119,044 B2
(45) Date of Patent: Sep. 14, 2021

(54) METHODS AND SYSTEMS FOR DETERMINING THE PRESENCE OF A MOLECULE IN A SAMPLE AND METHOD AND SYSTEM FOR DETERMINING A RANGE-RESOLVED CONCENTRATION OF A MOLECULE IN A SCENE

(71) Applicant: INSTITUT NATIONAL D'OPTIQUE, Québec (CA)

(72) Inventor: François Babin, Québec (CA)

(73) Assignee: INSTITUT NATIONAL D'OPTIQUE, Quebec (CA)

(*) Notice: Subject to any disclaimer, the term of this patent is extended or adjusted under 35 U.S.C. 154(b) by 56 days.

(21) Appl. No.: 16/326,763

(22) PCT Filed: Aug. 18, 2017

(86) PCT No.: PCT/CA2017/050980
§ 371 (c)(1),
(2) Date: Feb. 20, 2019

(87) PCT Pub. No.: WO2018/035603
PCT Pub. Date: Mar. 1, 2018

(65) Prior Publication Data
US 2019/0204231 A1    Jul. 4, 2019

Related U.S. Application Data

(60) Provisional application No. 62/377,961, filed on Aug. 22, 2016.

(51) Int. Cl.
*G01J 3/44*    (2006.01)
*G01N 21/65*    (2006.01)
(Continued)

(52) U.S. Cl.
CPC ............ *G01N 21/65* (2013.01); *G01J 3/44* (2013.01); *G01J 3/4406* (2013.01); *G01M 3/18* (2013.01);
(Continued)

(58) Field of Classification Search
CPC .... G01N 21/65; G01N 21/4795; G01N 21/25; G01N 21/39; G01J 3/44; G01J 3/4406; G01J 3/10
See application file for complete search history.

(56) References Cited

U.S. PATENT DOCUMENTS 2,974,226 A    3/1961    Fisher
6,040,191 A    3/2000    Grow
(Continued)

FOREIGN PATENT DOCUMENTS

WO    2010112531 A1    10/2010

OTHER PUBLICATIONS

Modern Raman Spectroscopy—A Practical Approach, W.E. Smith and G. Dent, 2005, John Wiley & Sons, Ltd ISBNs: 0-471-49668-5 (HB); 0-471-49794-0 (PB) (Year: 2005).*
(Continued)

*Primary Examiner* — Tarifur R Chowdhury
*Assistant Examiner* — Jonathon Cook
(74) *Attorney, Agent, or Firm* — Reno Lessard; Norton Rose Fulbright Canada LLP

(57) ABSTRACT

The method for determining the presence of a molecule having a Raman resonance generally comprises illuminating a sample with a first radiation beam, the first radiation beam having a first excitation wavelength being tuned to a Raman resonance of the molecule; receiving a first return signal from the sample following illumination of the sample with the first radiation beam; measuring a first intensity of the first return signal using an intensity detector; illuminating the
(Continued)

sample with a second radiation beam, the second radiation beam lacking the first excitation wavelength and having a second excitation wavelength being different from the first excitation wavelength; receiving a second return signal from the sample following illumination of the sample with the second radiation beam; measuring a second intensity of the second return signal using an intensity detector; and determining the presence of the molecule in the sample based on the first and second intensities.

11 Claims, 16 Drawing Sheets

(51) Int. Cl.

| | |
|---|---|
| *G01M 3/18* | (2006.01) |
| *G01M 3/38* | (2006.01) |
| *G01N 21/94* | (2006.01) |
| *G01N 21/33* | (2006.01) |
| *G01N 21/17* | (2006.01) |

(52) U.S. Cl.
CPC .............. *G01M 3/38* (2013.01); *G01N 21/33* (2013.01); *G01N 21/94* (2013.01); *G01N 2021/1797* (2013.01); *G01N 2201/0214* (2013.01)

(56) References Cited

U.S. PATENT DOCUMENTS

| | | |
|---|---|---|
| 6,377,828 B1 | 4/2002 | Chaiken et al. |
| 7,027,924 B2 | 4/2006 | Spoonhower et al. |
| 7,139,072 B1 | 11/2006 | Boss et al. |
| 2006/0197947 A1* | 9/2006 | Wang ........................ G01J 3/44 356/301 |
| 2008/0007716 A1* | 1/2008 | Igarashi ................. G01N 21/65 356/72 |
| 2009/0219525 A1 | 9/2009 | Marcus et al. |
| 2010/0241357 A1 | 9/2010 | Chan et al. |
| 2011/0261354 A1* | 10/2011 | Sinfield ................. G01J 3/0291 356/301 |
| 2011/0309248 A1 | 12/2011 | Thoma et al. |
| 2012/0099102 A1 | 4/2012 | Bello |
| 2012/0162641 A1 | 6/2012 | Schmidt et al. |
| 2013/0182247 A1* | 7/2013 | Volodin .................... G01J 3/00 356/301 |
| 2014/0253919 A1 | 9/2014 | Yui |
| 2015/0064778 A1 | 3/2015 | Yamada |
| 2016/0116414 A1 | 4/2016 | Day et al. |

OTHER PUBLICATIONS

Adam Willitsford et al., "Resonance enhanced Raman scatter in liquid benzene at vapor-phase absorption peaks", Optics Express, vol. 21 No. 22, Oct. 24, 2013, pp. 26150-26161, United States.

Howard S. Sands et al. "UV-Excited Resonance Raman Spectroscopy of Narcotics and Explosives", Journal of Forensic Sciences, vol. 43, No. 3, 1998, pp. 509-513, United States.

Anneli Ehlerding et al. "Resonance-Enhanced Raman Spectroscopy on Explosives Vapor at Standoff Distances", International Journal of Spectroscopy, vol. 2012, Article ID 158715, Nov. 2, 2011, pp. 1-9, Sweden.

Roberto Chirico et al., "Stand-off detection of traces of explosives and precursors on fabrics by UV raman spectroscopy", Optics and Photonics for Counterterrorism, Crime Fighting, and Defence VIII, vol. 8546, 2012, pp. 1-5, Italy.

M. Gaft et al., "UV gated Raman spectroscopy for standoff detection of explosives", Optical Materials 30, Jan. 2, 2008, pp. 1739-1746, United States.

* cited by examiner

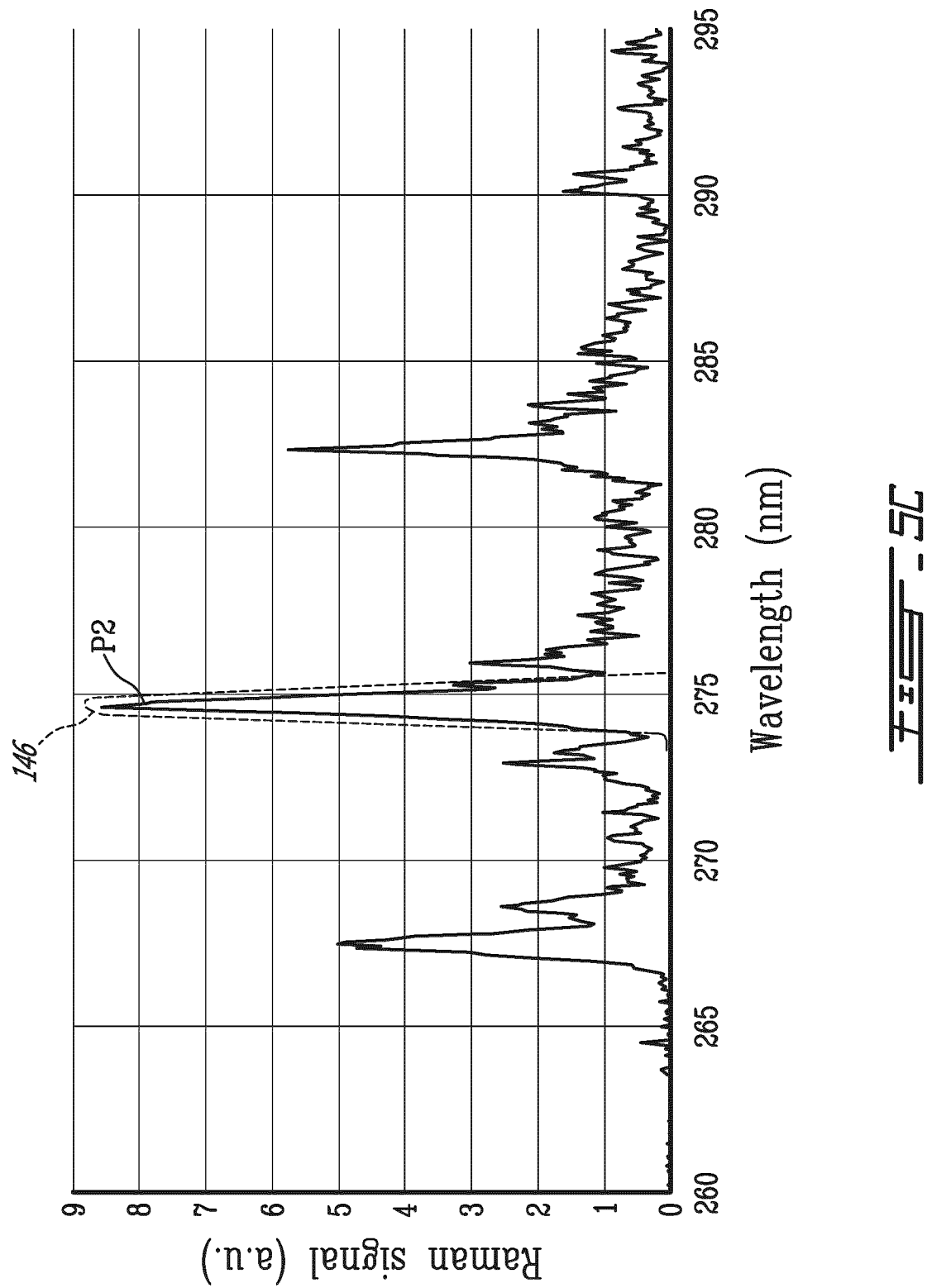

METHODS AND SYSTEMS FOR DETERMINING THE PRESENCE OF A MOLECULE IN A SAMPLE AND METHOD AND SYSTEM FOR DETERMINING A RANGE-RESOLVED CONCENTRATION OF A MOLECULE IN A SCENE

FIELD

The improvements generally relate to the field of molecule detection and, more specifically, relates to molecule detection using resonance Raman scattering, fluorescence and absorption.

BACKGROUND

Raman scattering is a type of light-matter interaction which consists in the inelastic scattering of an incident photon by a molecule which is then excited to a higher vibrational or rotational energy level. When incident photons are scattered by the molecule, most photons are elastically scattered via Rayleigh scattering, such that the scattered photons have the same energy (i.e. same wavelength) as the incident photons. Raman scattering represents a small fraction of all the scattered incident excitation photons which are scattered, with the scattered photons having an emission wavelength different from, and usually higher than, the excitation wavelength of the incident photons.

An optical absorption interaction is another type of light-matter interaction in which a molecule absorbs a photon having a wavelength closed in energy to one of the transitions of the molecule; electronic, vibrational or rotational. Such a wavelength is generally referred to as an absorption wavelength.

Fluorescence is yet another type of light-matter interaction in which a molecule emits radiation after having absorbed radiation. In most cases, the emitted radiation has a longer wavelength, and therefore lower energy, than the absorbed radiation.

There exist methods of detecting a molecule in a sample based on Raman scattering, fluorescence and/or absorption. Typically, these methods involve illuminating a sample with a radiation beam and measuring a spectrally-resolved spectrum following said illumination. Then, the spectrally-resolved spectrum is analyzed to find the presence of any features indicative of absorption interactions occurring at the wavelength of the radiation beam and/or to find the presence of any features indicative of Raman scattering or fluorescence interactions occurring at wavelengths different from that of the radiation beam.

However, although these existing methods are satisfactory to a certain degree, there remains room for improvement, especially in avoiding the requirement of measuring a spectrally-resolved trace, which can require bulky hardware.

SUMMARY

A Raman resonance interaction refers to a type of Raman scattering in which the molecule has been excited by a photon having an excitation wavelength close in energy to one of the electronic transitions of the molecule, and generally leads to greatly enhanced intensity of Raman scattering.

In accordance with one aspect, there is provided a system and a method to detect a molecule in a sample. The method and system can include using radiation generation at two wavelengths, including a first excitation wavelength selected specifically to target a Raman resonance of the molecule, and a second wavelength selected specifically to avoid the Raman resonance(s) of the molecule. The second wavelength can be selected to be as close as practical to the first excitation wavelength in some embodiments. Accordingly, detecting a significant difference in intensity stemming from the exposure to the two different wavelengths can be indicative of a presence of the molecule. A method and system in accordance with this aspect can be used to detect the presence of a molecule indicative of a petroleum product spill, or any other molecule exhibiting satisfactory Raman resonance and which would require to be detected, for instance.

In accordance with another aspect, there is provided a method for determining the presence of a molecule having a Raman resonance, the method comprising: illuminating a sample with a first radiation beam, the first radiation beam having a first excitation wavelength being tuned to a Raman resonance of the molecule; receiving a first return signal from the sample following illumination of the sample with the first radiation beam; measuring a first intensity of the first return signal using an intensity detector; illuminating the sample with a second radiation beam, the second radiation beam lacking the first excitation wavelength and having a second excitation wavelength being different from the first excitation wavelength; receiving a second return signal from the sample following illumination of the sample with the second radiation beam; measuring a second intensity of the second return signal using an intensity detector; and determining the presence of the molecule in the sample when the first intensity and the second intensity are indicative of a Raman resonance interaction between the first radiation beam and the molecule.

In accordance with another aspect, there is provided a system for determining the presence of a molecule having a Raman resonance, the system comprising: a housing; at least one radiation generator mounted to the housing and adapted to illuminate a sample with a first radiation beam, the first radiation beam having a first excitation wavelength being tuned to a Raman resonance of the molecule, and adapted to illuminate the sample with a second radiation beam, the second radiation beam lacking the first excitation wavelength and having a second excitation wavelength being different from the first excitation wavelength; at least one receiving assembly mounted to the housing, adapted to receive first and second return signals from the sample following illumination of the sample with a corresponding one of the first and second radiation beams; at least one intensity detector mounted to the housing and adapted to measure a first intensity of the first return signal and a second intensity of the second return signal; and a computer configured to determine the presence of the molecule in the sample when the first intensity and the second intensity are indicative of a Raman resonance interaction between the first radiation beam and the molecule.

Similarly to the Raman resonance interaction, a fluorescence resonance interaction refers to a type of fluorescence in which the molecule has absorbed a photon having an excitation wavelength close in energy to one of the electronic transitions of the molecule, and generally leads to greatly enhanced intensity of fluorescence.

In accordance with another aspect, there is provided a system and a method to detect a molecule in a sample. The method and system can include using a first broadband radiation beam which has a first excitation wavelength selected specifically to target a fluorescence resonance of the molecule, and which is used to illuminate the sample. By propagating the first broadband radiation beam into a gas cell containing the molecule, the molecule of the gas cell absorbs optical power at the first excitation wavelength so as to obtain a second broadband radiation beam lacking the first excitation wavelength and having wavelengths other than the first excitation wavelength. By illuminating the sample with the second broadband beam, the fluorescence resonance(s) of the molecule is avoided. Accordingly, detecting a significant difference in intensity stemming from the exposure to the first and second broadband radiation beams can be indicative of a presence of the molecule. A method and system in accordance with this aspect can be used to detect the presence of a molecule indicative of a petroleum product spill, or any other molecule exhibiting satisfactory fluorescence resonance and which would require to be detected, for instance. In alternate embodiments, the gas cell containing the molecule can be replaced with a resonance filtering element configured to filter out the wavelength(s) used to excite fluorescence resonance of the molecule from the first broadband radiation beam.

In accordance with another aspect, there is provided a method for determining the presence of a molecule having a fluorescence resonance, the method comprising: illuminating a sample with a first broadband radiation beam, the first broadband radiation beam having a first excitation wavelength being tuned to a fluorescence resonance of the molecule; receiving a first return signal from the sample following illumination of the sample with the first broadband radiation beam; measuring a first intensity of the first return signal using an intensity detector; filtering out the absorption wavelength of the molecule from a broadband radiation beam and obtaining a second broadband radiation beam lacking the first excitation wavelength and having wavelengths other than the first excitation wavelength; illuminating the sample with the second broadband radiation beam; receiving a second return signal from the sample following illumination of the sample with the second broadband radiation beam; measuring a second intensity of the second return signal using an intensity detector; and determining the presence of the molecule in the sample when the first intensity and the second intensity are indicative of a fluorescence resonance interaction between the first broadband radiation beam and the molecule.

In accordance with another aspect, there is provided a system for determining the presence of a molecule having a fluorescence resonance, the system comprising: a housing; a first beam path; a second beam path; a resonance filtering element mounted to the housing, in which the second beam path passes; a broadband radiation generator mounted to the housing, adapted to generate a first broadband radiation beam along the first beam path, the first broadband radiation beam having a first excitation wavelength being tuned to a fluorescence resonance of the molecule, the resonance filtering element filtering out the first excitation wavelength from a broadband radiation beam propagated along the second beam path to obtain a second broadband radiation beam lacking the first excitation wavelength, the broadband radiation generator illuminating the sample with the first broadband radiation beam and illuminating the sample with the second broadband radiation beam; at least one receiving assembly mounted to the housing, adapted to receive first and second return signals from the sample following illumination of the sample with a corresponding one of the first and second broadband radiation beams; at least one intensity detector mounted to the housing and adapted to measure a first intensity of the first return signal and a second intensity of the second return signal; and a computer configured to determine the presence of the molecule in the sample when the first intensity and the second intensity are indicative of a fluorescence resonance interaction between the first broadband radiation beam and the molecule.

In accordance with another aspect, there is provided a system and a method to detect a molecule in a scene. The method and system include one or more light-emitting diodes (LEDs) to generate a first pulsed broadband radiation beam which has a first wavelength selected specifically to target an absorption wavelength of the molecule, and which is used to illuminate the scene. By propagating the first pulsed broadband radiation beam into a gas cell containing the molecule, the molecule of the gas cell absorbs optical power at the first wavelength so as to obtain a second pulsed broadband radiation beam lacking the first wavelength and having wavelengths other than the first wavelength. By illuminating the scene with the second pulsed broadband beam, the absorption by the molecule is lessened. Accordingly, detecting a significant difference in intensity stemming from the exposure to the first and second pulsed broadband radiation beams can be indicative of a presence of the molecule. The method and system is also configured in a light detection and ranging (LIDAR) configuration to determine a range-resolved concentration value of the molecule in the scene. In other embodiments, the gas cell can be used to filter out the absorption wavelength from the second return signal instead of being used to filter out the absorption wavelength from the second pulsed broadband radiation beam. In alternate embodiments, the gas cell containing the molecule can be replaced with an absorption filtering element configured to filter out the absorption wavelength of the molecule from the first pulsed broadband radiation beam or from a second return signal. A method and system in accordance with this aspect can be used to detect the presence of a molecule indicative of a petroleum product spill, or any other molecule exhibiting satisfactory absorption wavelength, and which would require to be detected, for instance.

In accordance with another aspect, there is provided a method for determining a range-resolved concentration of a molecule in a scene, the method comprising: illuminating the scene with a first pulsed broadband radiation beam using one or more light-emitting diodes (LEDs), the first pulsed broadband radiation beam having a wavelength being tuned to an absorption wavelength of the molecule; receiving a first return signal from the scene following illumination of the scene with the first pulsed broadband radiation beam; measuring a first intensity of the first return signal using an intensity detector; illuminating the scene with a second pulsed broadband radiation beam using one or more LEDs, the second pulsed broadband radiation beam having a wavelength being tuned to the absorption wavelength of the molecule; receiving a second return signal from the scene following illumination of the scene with the second pulsed broadband radiation beam; wherein at least one of said illuminating the scene with the second pulsed broadband radiation beam and said receiving the second return signal includes filtering out, using an absorption filtering element, the absorption wavelength of the molecule from a corresponding one of the second pulsed broadband radiation beam and the second return signal; measuring a second intensity of the second return signal using an intensity detector; and said steps of illuminating and measuring being synchronized with one another, allowing determining a concentration value of the molecule for at least one range value in the scene based on the first intensity and on the second intensity.

In accordance with another aspect, there is provided a system for determining a range-resolved concentration of a molecule in a scene, the system comprising: a housing; one or more LEDs mounted to the housing, adapted to illuminate the scene with a first pulsed broadband radiation beam and to illuminate the scene with a second pulsed broadband radiation beam, the first and second pulsed broadband radiation beams having a wavelength being tuned to an absorption wavelength of the molecule; at least one receiving assembly mounted to the housing, adapted to receive first and second return signals from the scene following illumination of the scene with a corresponding one of the first and second pulsed broadband radiation beams; an absorption filtering element mounted to the housing and configured to filter out the absorption wavelength of the molecule from at least one of the second pulsed broadband radiation beam and the second return signal; at least one intensity detector mounted to the housing and adapted to measure a first intensity of the first return signal and a second intensity of the second return signal; and a computer configured to operate the one or more LEDs and the at least one intensity detector in a synchronized manner to determine a concentration value of the molecule for at least one range value in the scene based on the first intensity and on the second intensity.

Many further features and combinations thereof concerning the present improvements will appear to those skilled in the art following a reading of the instant disclosure.

DESCRIPTION OF THE FIGURES

In the figures,

FIGS. 5A, 5B and 5C are graphs showing exemplary Raman detection spectral bands provided by different filter elements of the system of FIG. 1, in accordance with some embodiments;

DETAILED DESCRIPTION

Figure 1:
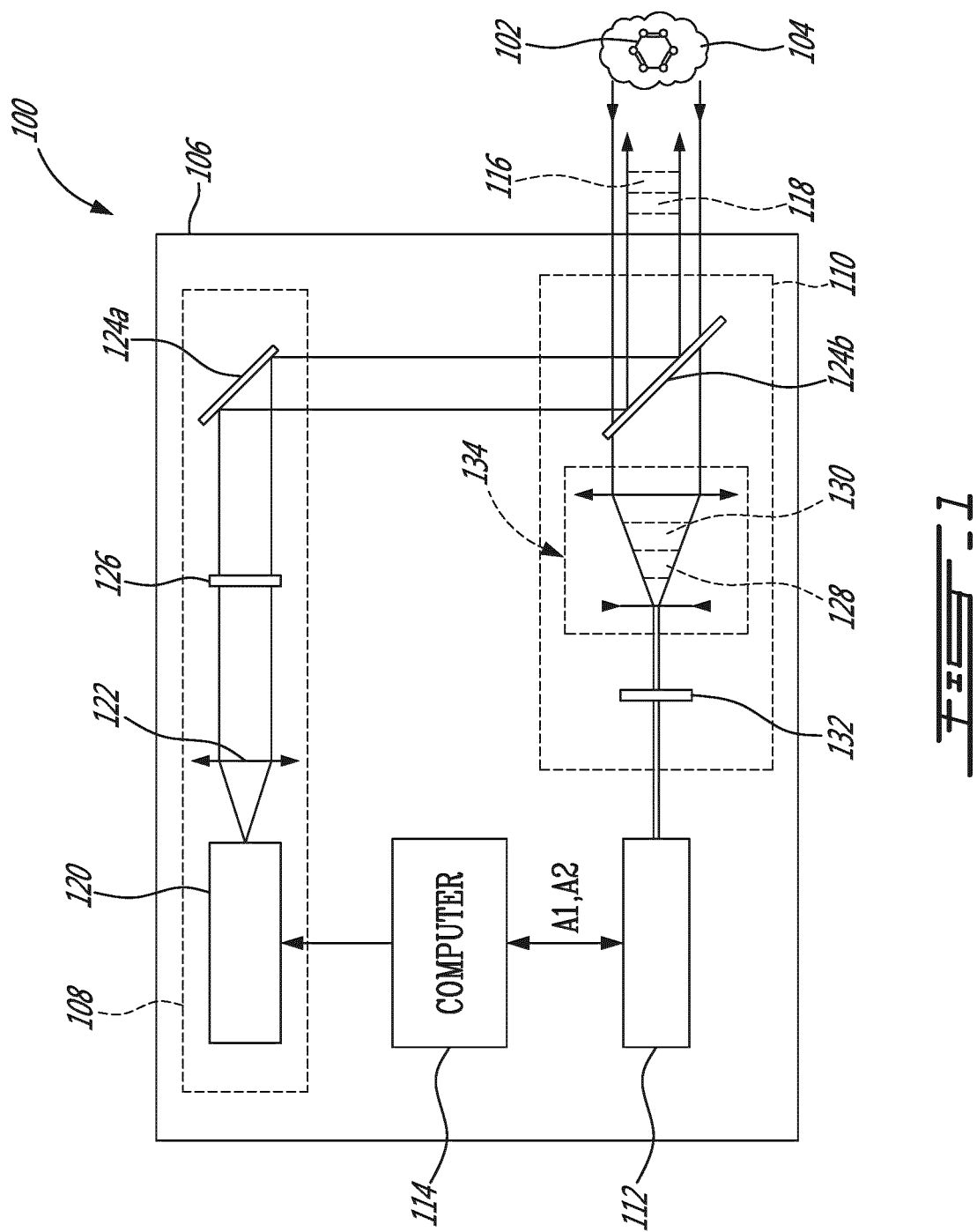
FIG. 1 is a schematic view of an example of a system for determining the presence of a molecule having a Raman resonance in a sample, in accordance with an embodiment.

FIG. 1 shows an example of a system 100 for determining the presence of a molecule 102 in a sample 104, in accordance with an embodiment. The sample 104 can be limited to a vial, for instance, or a scene, depending on the embodiment.

In this disclosure, the term "molecule" is used broadly so as to encompass any suitable kind of molecule, lying in gaseous form such as in the atmosphere, in solid form such as in a solid surface, or in a liquid form such as in water. The term "molecule" is generally used in its singular form, however, it could have been used to the plural interchangeably without changing the scope of this disclosure.

Examples of molecules 102 having a Raman resonance can include any aromatic compounds (e.g., benzene, toluene, ethylbenzene, xylene), or molecules such as NO, $NO_2$ and $SO_2$, or any other molecules that scatter relatively stronger when excited at a Raman resonance thereof.

As depicted, the system 100 has a housing 106, a radiation generator 108, a receiving assembly 110, an intensity detector 112 and a computer 114.

In this embodiment, the radiation generator 108, the receiving assembly 110, the intensity detector 112 and the computer 114 are all mounted inside the housing 106. In some embodiments, however, the computer 114 can be external to the housing 106 and be communicatively coupled to the intensity detector 112 and/or to the radiation generator 108 over a wired or a wireless communication link.

The radiation generator 108 is adapted to illuminate the sample 104 with a first radiation beam 116. The first radiation beam 116 has a first excitation wavelength $\lambda 1$ being tuned to a Raman resonance of the molecule 102 under examination. In other words, the first radiation beam 116 has a substantial optical power value at the first excitation wavelength $\lambda 1$.

The radiation generator 108 is also adapted to illuminate the sample 104 with a second radiation beam 118. The second radiation beam 118 lacks the first excitation wavelength $\lambda 1$ and has a second excitation wavelength $\lambda 2$ being different from the first excitation wavelength λ1. Differently put, the second radiation beam 118 has no substantial optical power value at the first excitation wavelength λ1 but has a substantial optical power value at the second excitation wavelength λ2.

In this example, the radiation generator 108 includes a tunable laser source 120 optically coupled with a routing element 122 and reflective elements 124a and 124b. The tunable laser source 120 can be used to generate both the first and second radiation beams 116 and 118 by tuning the emission wavelength of the tunable laser source 120 between the first excitation wavelength λ1 and the second excitation wavelength λ2. Preferably, the linewidth of the first radiation beam 116 is smaller than the width of the excitation peak of the selected Raman resonance.

As shown in this example, the routing element 122 is a collimating element. However, the routing element 122 can be a diverging element, a collimating element or a focusing element depending on the embodiment.

As can be seen, the reflective elements 124a and 124b reflect the first and second radiation beams 116 and 118 towards the sample 104 as desired. The number of reflective elements may differ from an embodiment to another. For instance, in some embodiments, the radiation generator 108 can have no reflective element whereas, in some other embodiments, a radiation generator 108 can have either a single one reflective element or more than two reflective elements. Additional reflective elements can be provided on the path common to the laser beam and the return beam in the form of scanning heads which are controllable by the computer 114. Scanning heads can be useful in scanning large areas such as the terrains or plant areas surrounding the plants (processing, refining, shipping and manufacturing plants for example) when in a standoff embodiment. Scanning heads can also be used to map samples, such as with a scanning microscope objective.

In this example, the radiation generator 108 has a first filter element 126 to filter out undesired spectral portions of the spectrum of the tunable laser source 120 in order to provide the first and second excitation wavelengths λ1 and λ2 with suitably narrow wavelength linewidths Δλ.

Accordingly, illumination of the sample 104 with the first radiation beam 116 can excite at least one of the Raman resonances of the molecule 102 when present in the sample 104 and cause a corresponding first return signal 128 to be propagated to the receiving assembly 110. Similarly, illumination of the sample 104 with the second radiation beam 118 can excite the Raman scattering of the molecule of interest, but not at any of its Raman resonance(s), which can cause a corresponding second, much weaker, return signal 130 to be propagated to the receiving assembly 110. Although the embodiment of FIG. 1 shows that the return propagates back to the receiving assembly 110, the receiving assembly can be positioned elsewhere to receive the return from any adequate direction.

The receiving assembly 110 is adapted to receive the first return signal 128 following illumination of the sample 104 with the first radiation beam 116. Similarly, the receiving assembly 110 is adapted to receive the second return signal 130 following illumination of the sample 104 with the second radiation beam 118.

In this example, the receiving assembly 110 is provided in the form of a single receiving assembly adapted to receive both the first return signal 128 and the second return signal 130. The receiver assembly 110 can include a second filter element 132 and a telescope 134 optically coupled with one another to receive and monitor the first and second return signals 128 and 130.

It is envisaged that the second filter element 132 is adapted to filter out wavelengths other than wavelengths comprised in one or more predetermined Raman detection spectral bands. In other words, the first and second return signals 128 and 130 that reach the intensity detector 112 have wavelengths comprised in the one or more predetermined Raman detection spectral bands, and no wavelengths outside these Raman detection spectral bands.

As shown in this example, the reflective element 124b is provided in the form of a dichroic element which reflects the first and second radiation beams 116 and 118 towards the sample 104 and that is optically transparent to wavelengths of the Raman scattering, higher in wavelength than the first and second excitation wavelengths λ1 and λ2, such that the first and second return signals 128 and 130 can reach the intensity detector 112.

In this embodiment, the telescope 134 is used to collect as much as possible of the first and second return signals 128 and 130 and to produce a reduced diameter beam to fit the intensity detector 112 or pass the second filter element 132. For instance, wavelengths higher than any expected Raman scattering may be filtered out using the second filter element 132.

The intensity detector 112 is adapted to measure a first intensity A1 of the first return signal 128 and to measure a second intensity A2 of the second return signal 130. The first and second intensities A1 and A2 may be digitized and stored in a memory of the computer 114.

Indeed, as the second radiation beam 118 lacks the first molecule specific resonant excitation wavelength λ1, the second intensity A2 is a non-specific DC level which can be due to Raman scattering of any molecule illuminated by the second radiation beam 118 in the sample 104 and/or fluorescence of any molecule illuminated by the second radiation beam 118 in the sample 104. This non-molecule specific DC level is common to both excitation beams 116 and 118.

In this embodiment, the intensity detector 112 is provided in the form of a single intensity detector, e.g., a photomultiplier (PM) tube, adapted to measure both the first intensity A1 of the first return signal 128 and the second intensity A2 of the second return signal 130. The measured intensities A1 and A2 can be indicative of the total (or integrated) amount of energy that reaches the intensity detector 112 and which is within the Raman detection spectral band dictated by the second filter element 132. In some other embodiments, the intensity detector 112 can be a photodiode (like a PIN detector), an avalanche photodiode (APD) and the like. In some other embodiments, the intensity detector 112 can be an array of detectors, such as a CCD camera, a CMOS camera or an intensified CCD or CMOS camera.

The computer 114 is configured to determine the presence of the molecule 102 in the sample 104 when the first intensity A1 and the second intensity A2 are indicative of a Raman resonance interaction between the first radiation beam 116 and the molecule 102. In some embodiments, the computer 114 can be used to signal the presence of the molecule 102 in the sample 104 in quasi real time.

For instance, when the first intensity A1 is substantially greater than the second intensity A2, a Raman resonance interaction can be determined to have occurred between the first radiation beam 116 and the molecule 102 and the presence of the molecule 102 in the sample 104 can be determined. The presence of the molecule 102 can be determined when a difference ΔA between the first intensity A1 and the second intensity A2 exceeds a given threshold. In alternate embodiments, a concentration of the molecule 102 in the sample 104 can be proportional to the difference between the first intensity A1 and the second intensity A2.

In contrast, when the first intensity A1 is not significantly greater than the second intensity A2, no Raman resonance interaction is likely to have occurred between the first radiation beam 116 and the molecule 102 and the absence of the molecule 102 in the sample 104 can be determined.

As can be understood, a continuously tunable radiation beam generator or a radiation generator tunable in small steps compared to the linewidth of the excitation peak of the Raman resonance can be used. In the latter case, it is possible to tune the excitation wavelength of the radiation beam, from the first excitation wavelength λ1 to the second excitation wavelength λ2, across the Raman resonance, while monitoring the return signal. Further, the wavelength of the radiation beam can be scanned back and forth through the Raman resonance. This can cause the return signal to vary repetitively in intensity. If the resonance is well behaved (one clear sharp peak), techniques developed for tunable laser absorption spectroscopy (TLAS) or tunable diode laser spectroscopy (TDLAS) can be used for signal processing and concentration estimation. Scanning the excitation wavelength can be performed only on a fraction of a nanometer.

The system 100 can be adapted to detect the presence of two or more molecule species by interrogating the sample 104 with two or more first excitation wavelengths, each of the two or more first excitation wavelengths corresponding to a Raman resonance of respective ones of the two or more different molecules. More than one Raman resonance of a single molecule species can be interrogated in some other embodiments.

Figure 2:
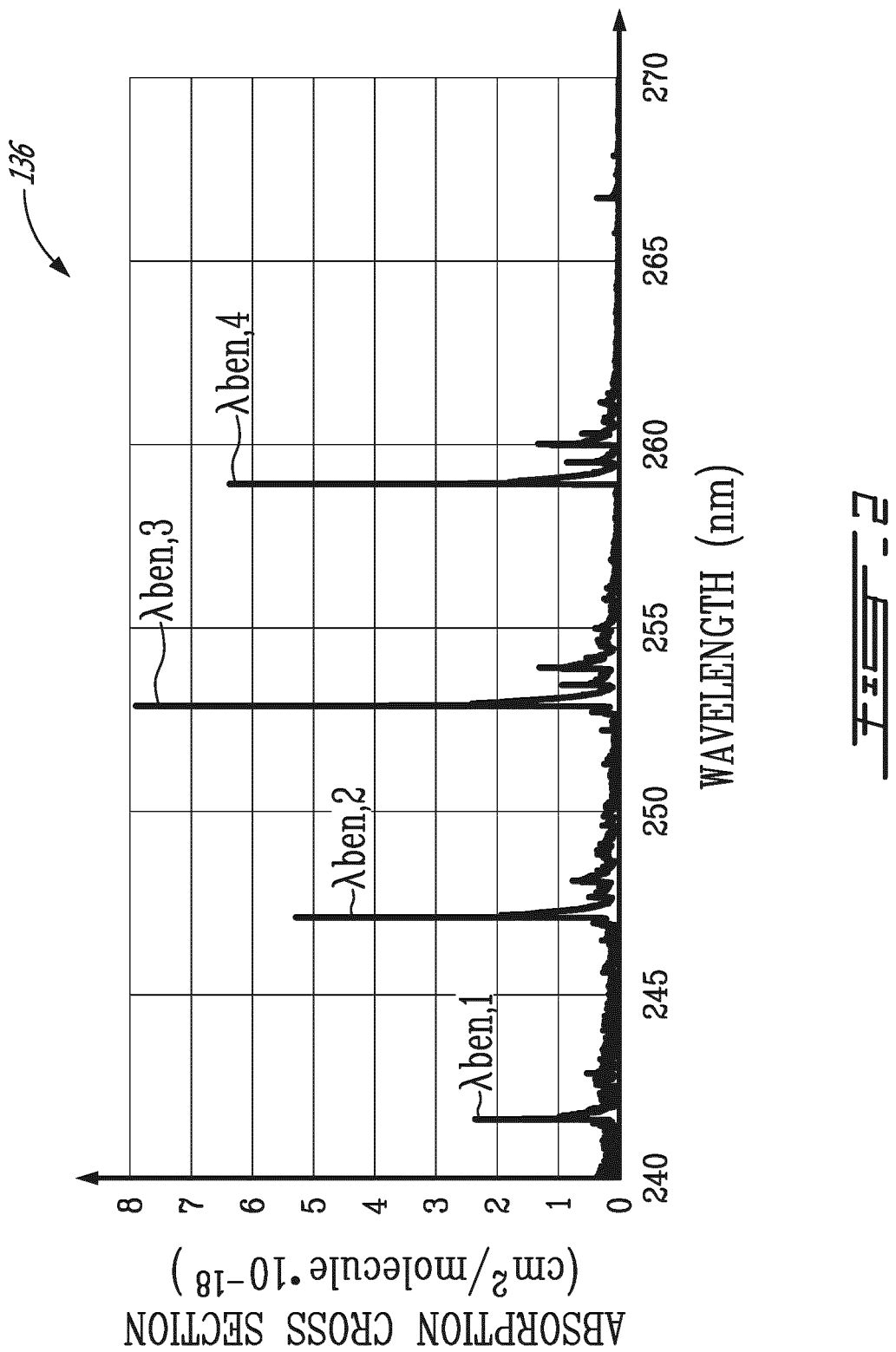
FIG. 2 is a graph showing an example of an absorption spectrum of the benzene molecule.

In one specific example, the molecule of interest can be the benzene molecule. FIG. 2 shows a graph of an example of an absorption spectrum 136 of the benzene molecule, i.e. the absorption cross-section of the benzene molecule as function of the wavelength. The absorption spectrum 136 is also indicative of a Raman resonance excitation spectrum. Each absorption feature reveals a corresponding Raman resonance due to the associated electronic transition.

As depicted, the benzene molecule has a plurality of Raman resonances. More specifically, the absorption spectrum 136 shows that the benzene molecule has a first large Raman resonance λben,1 at about 241.60 nm, a second large Raman resonance λben,2 at about 247.60 nm, a third large Raman resonance λben,3 at about 252.87 nm and a fourth large Raman resonance λben,4 at about 258.92 nm. The benzene molecule can have other Raman resonances, these first, second, third and fourth Raman resonances λben,1, λben,2 λben,3 and λben,4 are described as examples only.

In this way, the radiation generator 108 can be provided in the form of a UV radiation generator. More specifically, in this example, the radiation generator 108 is adapted to generate the first radiation beam 116 having a first excitation wavelength λ1 tuned to at least one of the first, second, third and fourth Raman resonances λben,1, λben,2, λben,3 and λben,4 of the benzene molecule in order to induce the desired Raman resonance interaction.

As shown in this embodiment, the radiation generator 108 can include an Ytterbium doped fiber laser adapted to generate a fundamental laser beam (e.g., having a fundamental wavelength between 1000 nm and 1100 nm) and a fourth harmonic generator optically coupled with the Ytterbium-doped fiber laser in a manner to generate a fourth harmonic laser beam. In these embodiments, the fourth harmonic laser beam can correspond to either one or both of the first and second radiation beams 116 and 118, with a fourth harmonic wavelength corresponding to the fundamental wavelength divided by the number 4.

For instance, when the molecule is benzene, the fundamental laser beam can have a fundamental wavelength of 1035.6 nm, whereas the fourth harmonic laser beam can have a fourth harmonic wavelength of 1035.6 nm/4=258.9 nm which corresponds to the fourth Raman resonance λben,4 of the benzene molecule, as described above.

Such UV laser beams having other wavelengths can be generated in any other suitable ways depending on the molecule under examination and on which Raman resonance is interrogated.

For instance, still in the case of benzene, a Nd:YAG laser source or any suitable equivalent may be used to produce a UV laser beam having an excitation wavelength of 258.9 nm.

More specifically, in an embodiment, generating a third harmonic laser beam (e.g., having a third harmonic wavelength of 355 nm or equivalent) from a fundamental laser beam of a Nd:YAG laser source (e.g., having a fundamental wavelength of 1064 nm), pumping an optical parametric oscillator (OPO) with the third harmonic laser beam to generate a green laser beam having a wavelength of about 517.8 nm, and then generating the second harmonic laser beam from the green laser beam to produce a UV laser beam having 258.9 nm may be possible. However, it will be understood that other suitable UV radiation generator may be used. For instance, filtered short-wave UV lamps, gas discharge lamps, and UV LEDs may be used in some embodiments.

Figure 3:
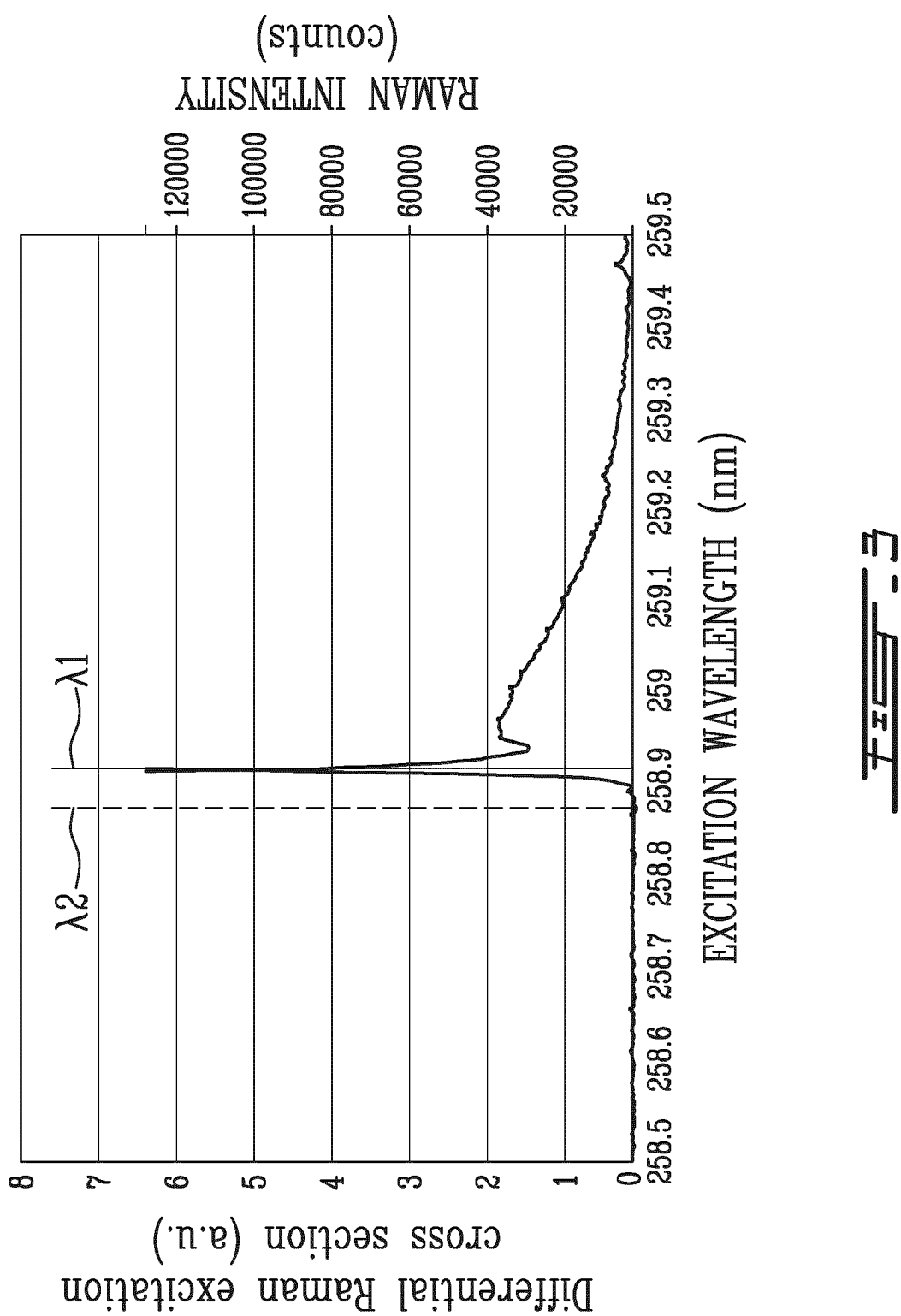
FIG. 3 is a graph showing example Raman intensity integrated over a given Raman detection spectral band when the benzene molecule is excited with a radiation beam having successive one of a plurality of excitation wavelengths.

FIG. 3 shows an enlarged view of the fourth Raman resonance λben,4 of the benzene molecule shown in FIG. 2. As can be seen, the first excitation wavelength λ1 has a Raman cross-section being greater than a Raman cross-section of the second excitation wavelength λ2 for the benzene molecule.

The right axis of FIG. 3 shows an expected Raman intensity measured by the intensity detector 112 when a sample 104 containing benzene molecules is excited with a first radiation beam 116 of 0.008 nm of full width at half maximum and having an excitation wavelength scanned between 258.5 nm and 259.5 nm.

More specifically, it can be seen that when the second radiation beam 118 having the second excitation wavelength λ2 of 258.85 nm excites the sample 104, the second intensity A2 measured by the intensity detector 112 is relatively low (e.g., a DC level just above 0 count) as compared with when the first radiation beam 116 having the first excitation wavelength λ1 of 258.93 μm excites the sample 104. Indeed, when the first excitation wavelength λ1 is tuned to a large Raman resonance of the benzene molecule, the first intensity A1 measured by the intensity detector is about 120 000 counts.

In some embodiments, the first excitation wavelength λ1 has a Raman excitation cross-section which is significantly greater than a Raman excitation cross-section of the second excitation wavelength λ2 for the molecule. For instance, the first excitation wavelength λ1 of the first radiation beam 116 has a Raman excitation cross-section at least ten times greater than the Raman excitation cross-section of the second excitation wavelength λ2 of the second radiation beam 118.

However, it is understood that the first and second excitation wavelengths λ1 and λ2 are chosen to be sufficiently close to one another to both cause Raman scattering in the same Raman detection spectral band. For instance, the difference between the first and second excitation wavelengths $\lambda 1$ and $\lambda 2$ can be of 0.05 nm or less.

Figure 4:
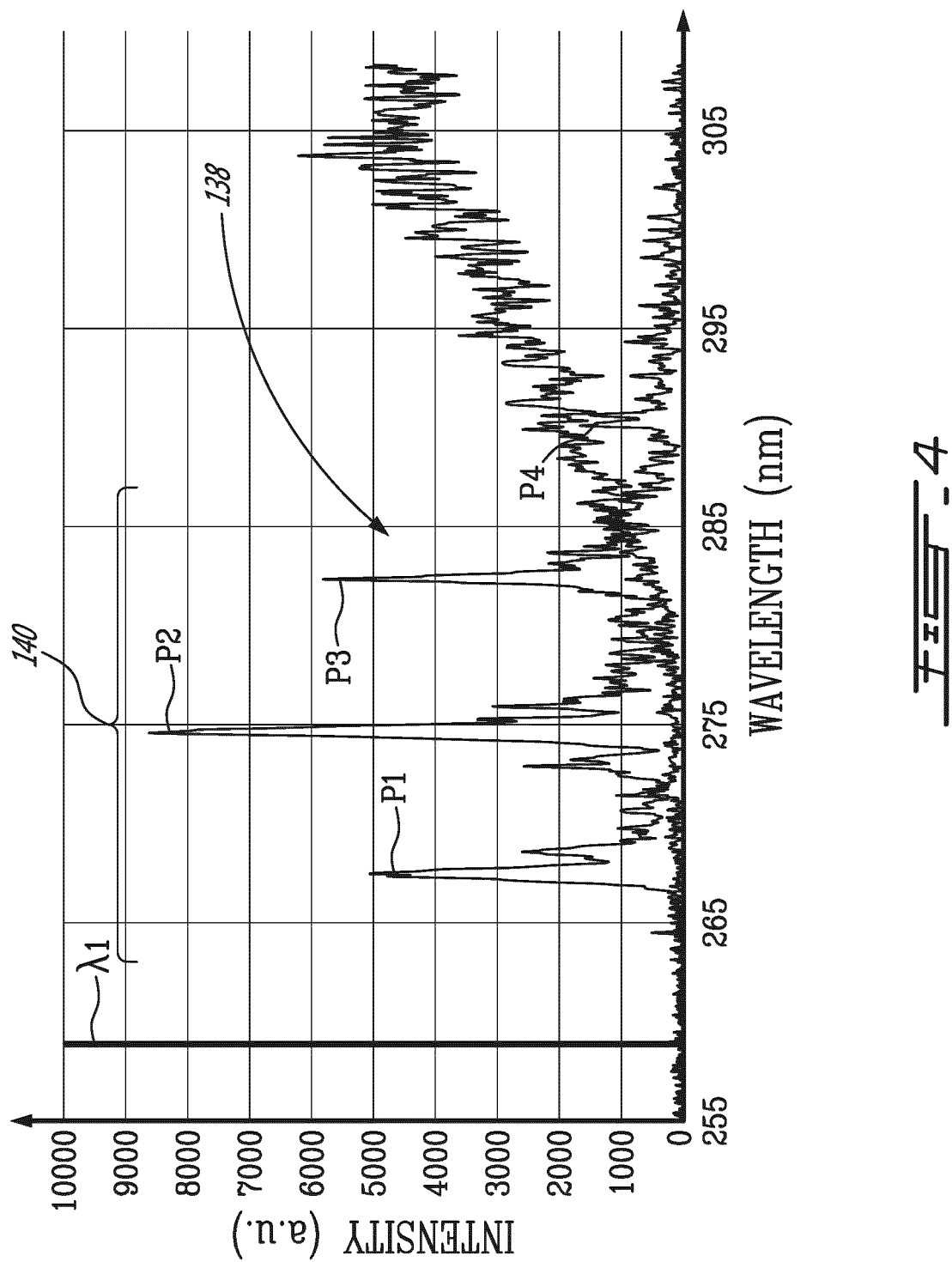
FIG. 4 is a graph showing an example of an experimental spectrally-resolved spectrum measured using an optical spectrometer.

FIG. 4 shows experimental results of a specific experiment conducted on a sample 104 containing molecules 102 of benzene at a concentration of 10 ppm in air. More specifically, FIG. 4 shows an experimental spectrally-resolved trace 138 obtained upon illumination of the sample 104 with the first radiation beam 116 having the first excitation wavelength $\lambda 1$ tuned to the fourth Raman resonance $\lambda$ben,4 of the benzene molecule (i.e. $\lambda e \approx 258.9$ nm).

In this case, the spectrally-resolved trace 138 was not obtained using the intensity detector 112, but using a bulkier optical spectrometer. In this example, the first radiation beam 116 is a UV pulsed laser beam having an emission linewidth $\Delta\lambda 1$ of about 0.03 nm and a pulse width of 10 ns. The first excitation wavelength $\lambda 1$ was added to FIG. 4 for ease of understanding.

As can be seen in this specific example, the experimental spectrally-resolved trace 138 has Raman scattering features in a Raman detection spectral band 140, which extends above the first excitation wavelength $\lambda 1$, in this example. As shown, the Raman scattering features include a first intensity peak P1 at a wavelength of about 268 nm, a second intensity peak P2 at a wavelength of about 275 nm, a third intensity peak P3 at a wavelength of about 283 nm, and a fourth intensity peak P4 at a wavelength of about 291 nm. In this example, as can be understood, some of the intensity peaks P1, P2, P3 and P4 can be associated with a Raman interaction between the first radiation beam 116 and nitrogen molecules or oxygen molecules in the air.

The second filter element 132 can differ from an embodiment to another. More specifically, the second filter element 132 is designed based on the first excitation wavelength $\lambda 1$ used and a desired associated Raman detection spectral band 140. In some embodiments, the Raman detection spectral band 140 can span between $\lambda 1 \pm \lambda r1$ and $\lambda 1 \pm \lambda r2$, wherein the plus sign is used in case of Stokes waves and the minus sign is used in case of anti-Stokes waves.

Figure 5A:
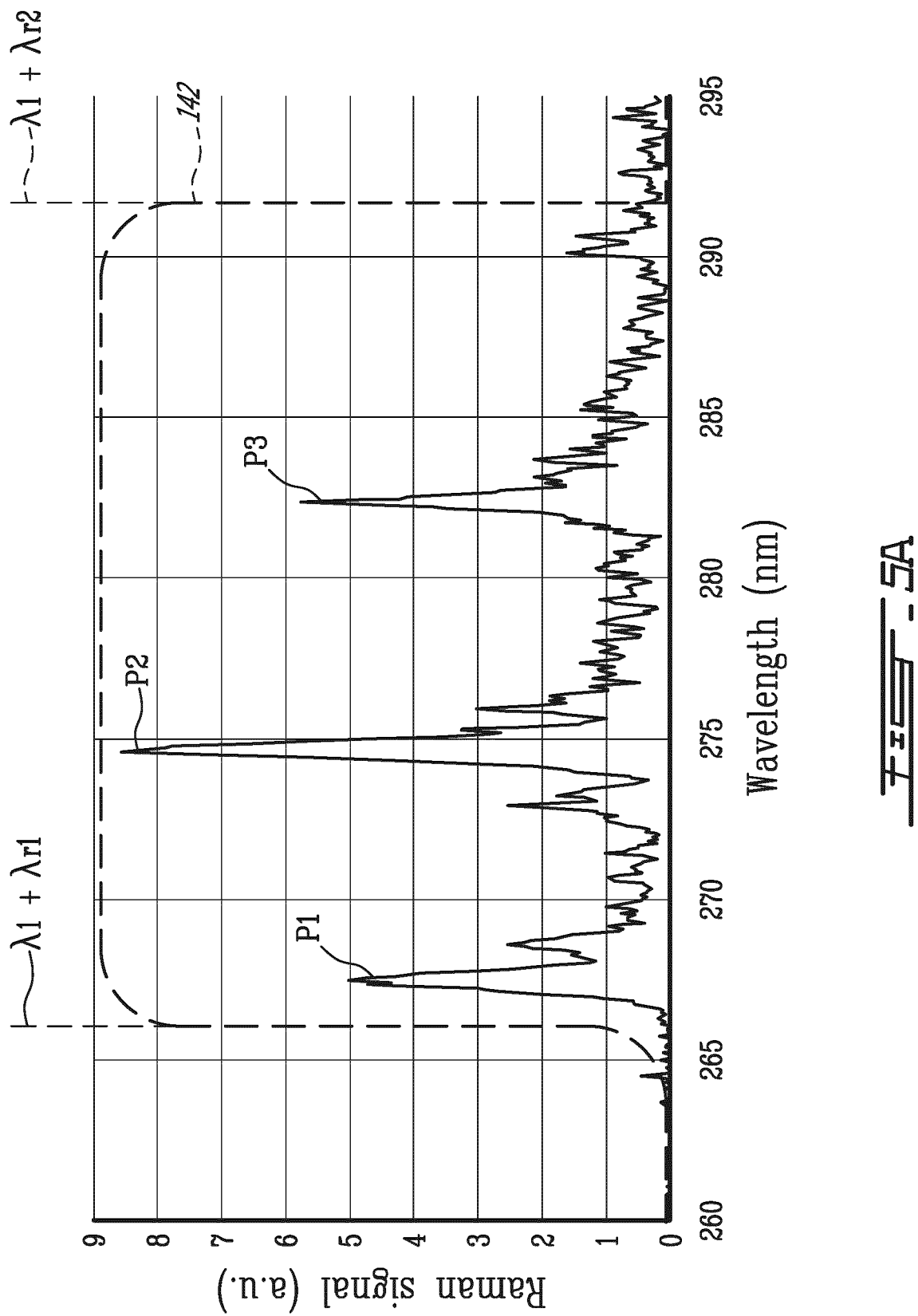

For instance, FIG. 5A shows a first Raman detection spectral band 142, which is designed to encompass the first, second and third intensity peaks P1, P2 and P3 shown in FIG. 4. In this example, for instance, the second filter element 132 is used to filter out wavelengths lower than $\lambda 1 + \lambda r1$ and wavelengths higher than $\lambda 1 + \lambda r2$.

Figure 5B:
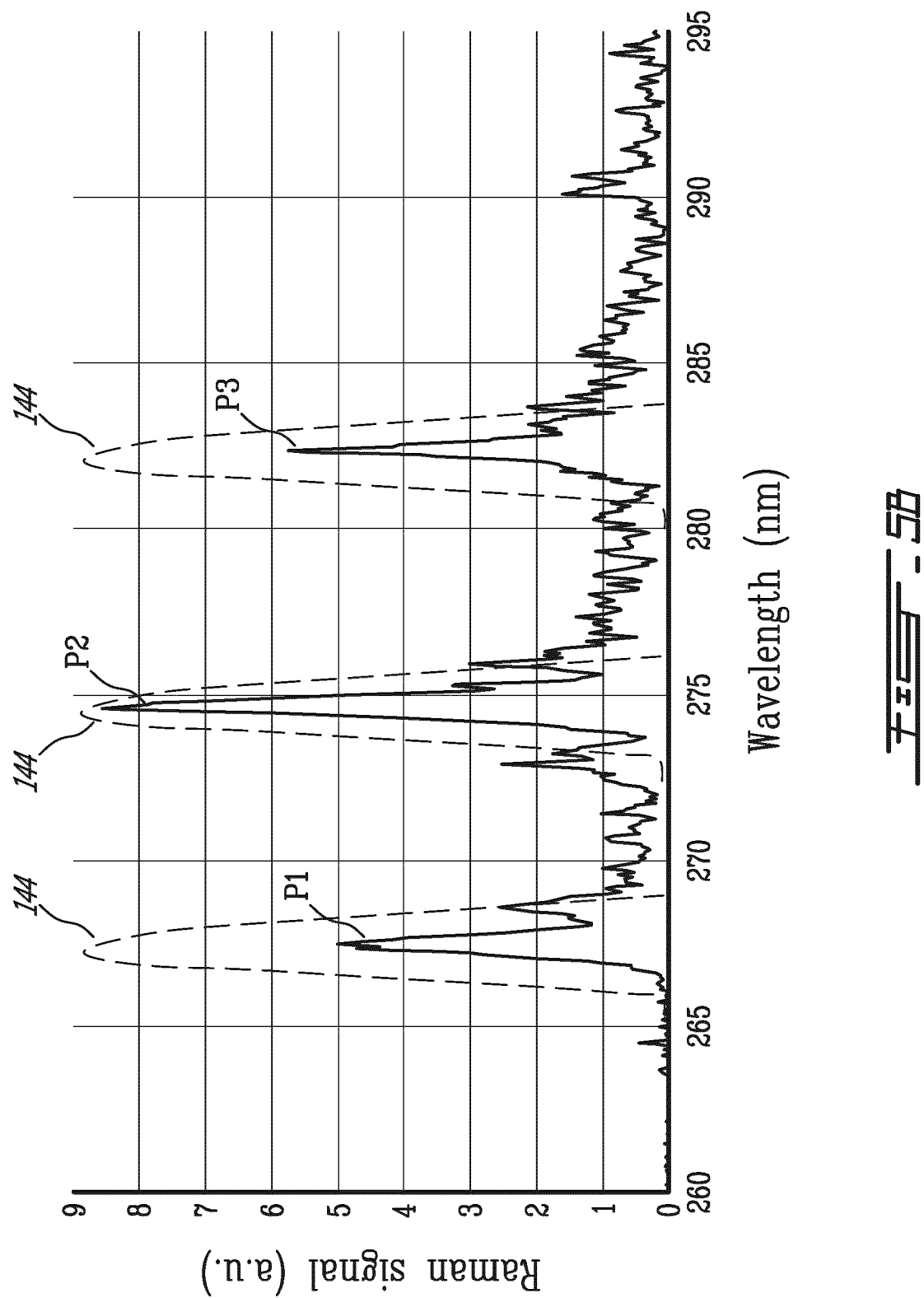

FIG. 5B shows second Raman detection spectral bands 144, which are designed to filter out wavelengths other than the intensity peaks P1, P2 and P3 shown in FIG. 4.

FIG. 5C shows a third Raman detection spectral band 146 which is designed to filter out wavelengths other than the intensity peak P2 shown in FIG. 4. Other Raman detection spectral bands can be used, depending on the embodiment.

The radiation generator 108 can be adapted to illuminate the sample 104 with the first radiation beam 116 for a first time duration $\Delta t1$ and then illuminate the sample 104 with the second radiation beam 118 for a second time duration $\Delta t2$. The first and second time durations $\Delta t1$ and $\Delta t2$ can be identical in some embodiments, whereas the first and second time durations $\Delta t1$ and $\Delta t2$ can be different in some other embodiments.

It is envisaged that the illumination of the sample 104 with the first and second radiation beams 116 and 118 can be performed in an alternating manner such that the sample 104 is illuminated with the first radiation beam 116 for the first time duration $\Delta t1$, then with the second radiation beam 118 for the second time duration $\Delta t2$, then again with the first radiation beam 116 for the first time duration $\Delta t1$, and so forth.

In some embodiments, the illumination of the sample 104 with the first radiation beam 116 for the first time duration $\Delta t1$ is quickly followed by the illumination of the sample 104 with the second radiation beam 118 for the second time duration $\Delta t2$, as in a low repetition rate double pulse system, each pulse in the double pulse having one of the $\lambda 1$ and one of the $\lambda 2$ wavelengths. In some other embodiments, the illumination of the sample 104 with the first radiation beam 116 for the first time duration $\Delta t1$ is spaced in time from the illumination of the sample 104 with the second radiation beam $\Delta t2$, as in a single pulse constant repetition rate system, every other pulse being either $\lambda 1$ or $\lambda 2$, alternatively.

An illumination of the sample 104 with the first radiation beam 116 for the first time duration $\Delta t1$ can even follow another illumination of the sample 104 with the first radiation beam 116 for the first time duration $\Delta t1$, as with a burst of pulses from a pulsed laser. Similarly, an illumination of the sample 104 with the second radiation beam 118 for the second time duration $\Delta t2$ can even follow another illumination of the sample 104 with the second radiation beam 118 for the second time duration $\Delta t2$.

Illumination of the sample 104 with the first and second radiation beams 116 and 118 may not overlap with one another. In any case, there should be at least a time duration during which the sample 104 is illuminated only with the second radiation beam 118.

Figure 6:
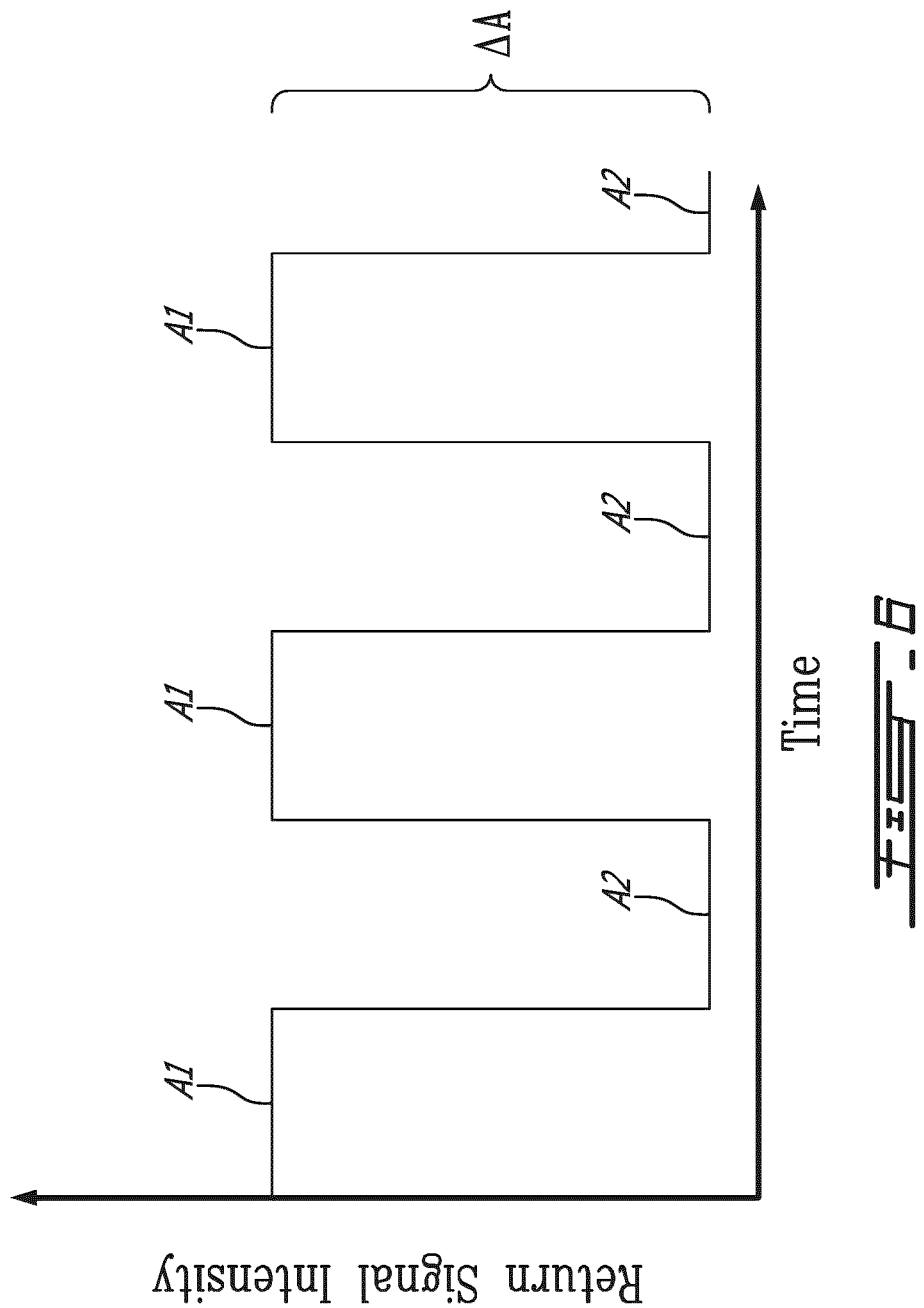
FIG. 6 is a graph showing successive first and second intensities as measured with an intensity detector of the system of FIG. 1, following illumination of the sample with successive first and second radiation beams, in accordance with an embodiment.

FIG. 6 shows an example of successive first and second intensities A1 and A2 as can be measured when the sample 104 is illuminated with the first and second radiation beams 116 and 118 in an alternating manner. In this case, the concentration of the molecule 102 in the sample 104 can be proportional to the difference $\Delta A$ between the first and second intensities, i.e. $\Delta A = A1 - A2$.

Figure 7:
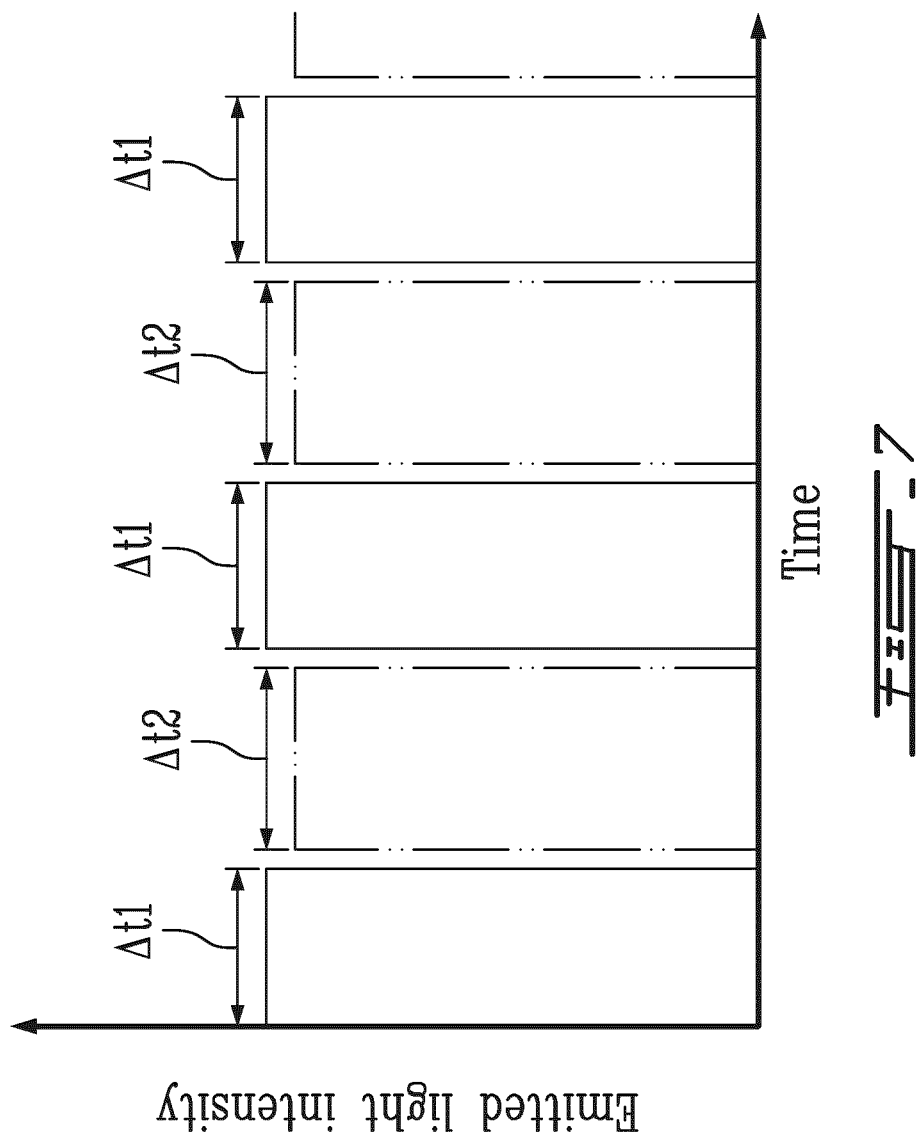
FIG. 7 is a graph showing an intensity of successive first and second radiation beams as emitted using a radiation generator of the system of FIG. 1, in accordance with an embodiment.

FIG. 7 is a graph showing the emitted intensity as a function of time, depending on which of the first and second radiation beams 116 and 118 is used to illuminate the sample 104 for a respective one of the first and second time durations $\Delta t1$ and $\Delta t2$. In some embodiments, the first and second intensities A1 and A2 shown in FIG. 6 are normalized with the emitted intensity shown in FIG. 6 to provide normalized intensity values.

Figure 8:
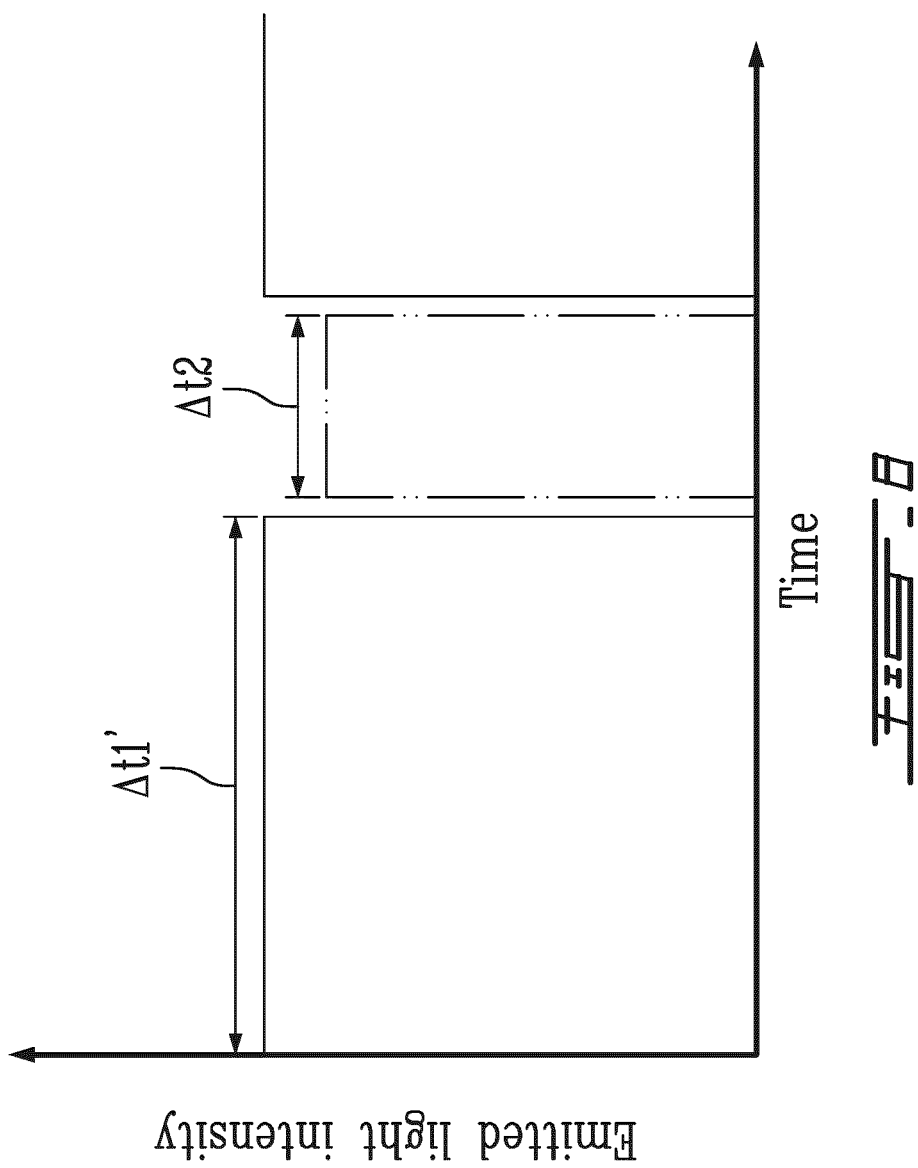
FIG. 8 is a graph showing an intensity of successive first and second radiation beams as emitted using the radiation generator of the system of FIG. 1, wherein the first radiation beam is maintained for a longer time duration than a time duration of the second radiation beam, in accordance with an embodiment.

FIG. 8 is a graph showing emitted intensity as a function of time, depending on which of the first and second radiation beams 116 and 118 is used to illuminate the sample 104. As depicted, illumination with the first radiation beam 116 (having an excitation wavelength $\lambda 1$ tuned to a Raman resonance of the molecule) may be maintained for a longer time duration $\Delta t1'$ than a time duration $\Delta t2$ of the second radiation beam 118 (having an excitation wavelength $\lambda 2$ which is out of tune of the Raman resonance).

Although the illumination is shown here as square waves, it will be clear to those skilled in the art that these illuminations can take any temporal shape, such as short pulses as from a Q-switched laser, sinewaves, triangular waves, and the like, with or without simultaneous parts.

Figure 9:
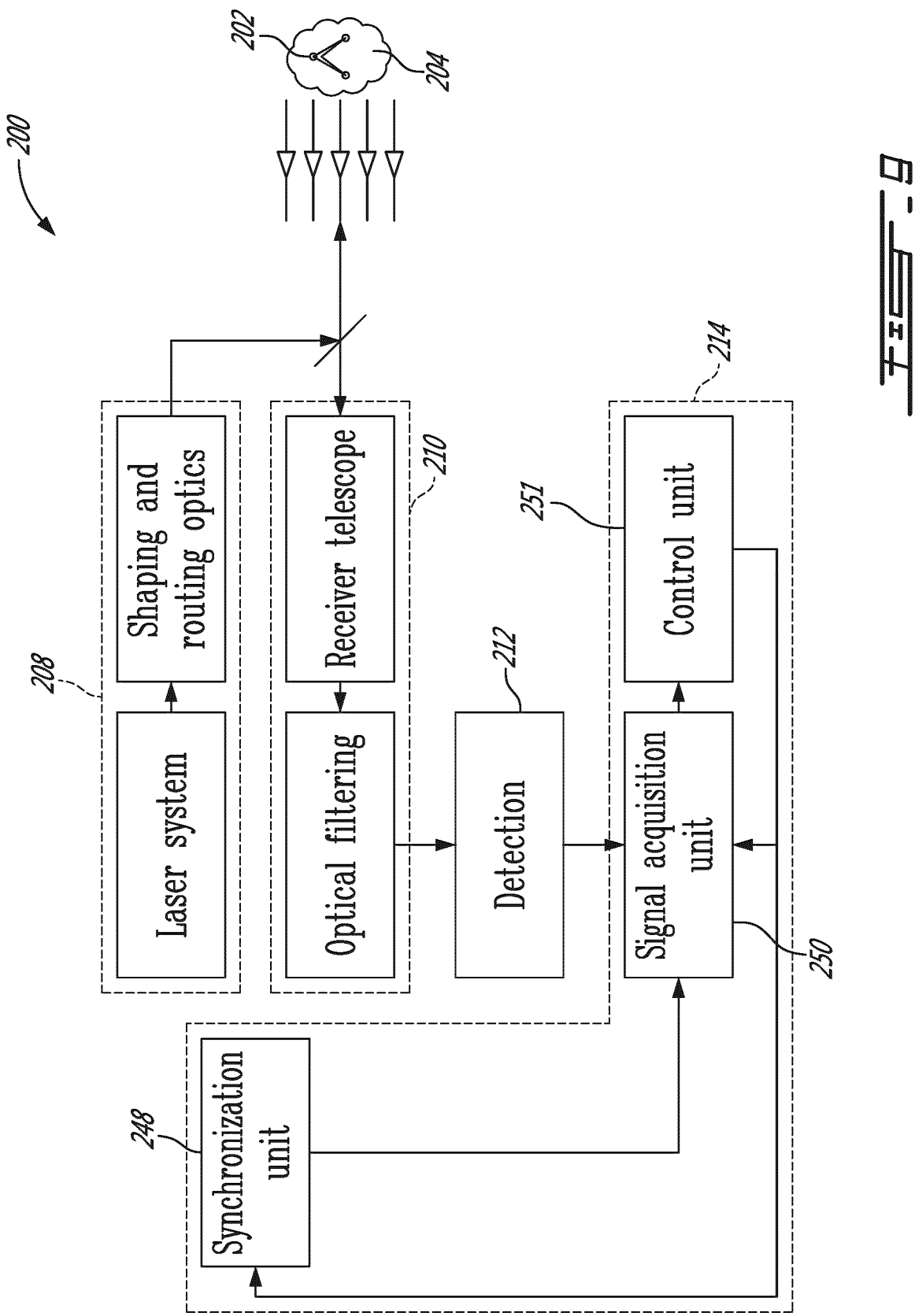
FIG. 9 is a schematic view of another example of a system for determining a concentration of a molecule having a Raman resonance, in accordance with an embodiment.

FIG. 9 shows another example of a system 200 for determining the presence of a concentration of a molecule 202 in a sample 204, in accordance with an embodiment. Similar elements bear similar reference numbers, but in the 200 series. As depicted, the system 200 has a radiation generator 208, a receiving assembly 210, an intensity detector 212 and a computer 214. As will be understood, the concentration of the molecule 202 in the sample 204 can be a range-resolved concentration and/or a concentration of the integrated-path type, depending on the embodiment.

In this example, the computer 214 includes a synchronization unit 248, such as a digital delay generator, a signal acquisition unit 250 and a control unit 251 to operate the radiation generator 208 and the intensity detector 212 in a short pulsed and synchronized manner allowing to determine a range resolved-concentration of the molecule 202 in the sample 204 such as a scene. For instance, the radiation generator 208 and the intensity detector 212 may be used in a light detection and ranging (LIDAR) configuration. In this way, the measure can be said to be spatially-resolved or time-resolved so as to provide a concentration value of the molecule at a given range value, or a concentration value at different range values in the scene.

As shown, the computer 214 is used to operate the system 200 in a LIDAR configuration, which can help reducing unwanted long lived fluorescence of other molecules that may be present in the sample 204. Indeed, Raman light is generated within a few picoseconds. The Raman scattering signal can thus have a temporal shape similar to that of the excitation pulse. If the excitation pulse is short, say a few hundreds of picoseconds or a few nanoseconds, synchronizing and rapidly gating the detection may allow removal of fluorescence generated at later times. The LIDAR configuration can also allow for spatially resolved standoff detection, enabling the rejection of any return signal generated at distances not of interest and allowing for a better signal to noise ratio. Such Raman resonance LIDAR may allow detection of amounts of a molecule vapor as low as a few hundreds of ppb-m (concentration times distance parameter proportional to total amount of the molecule to be detected).

Figure 10:
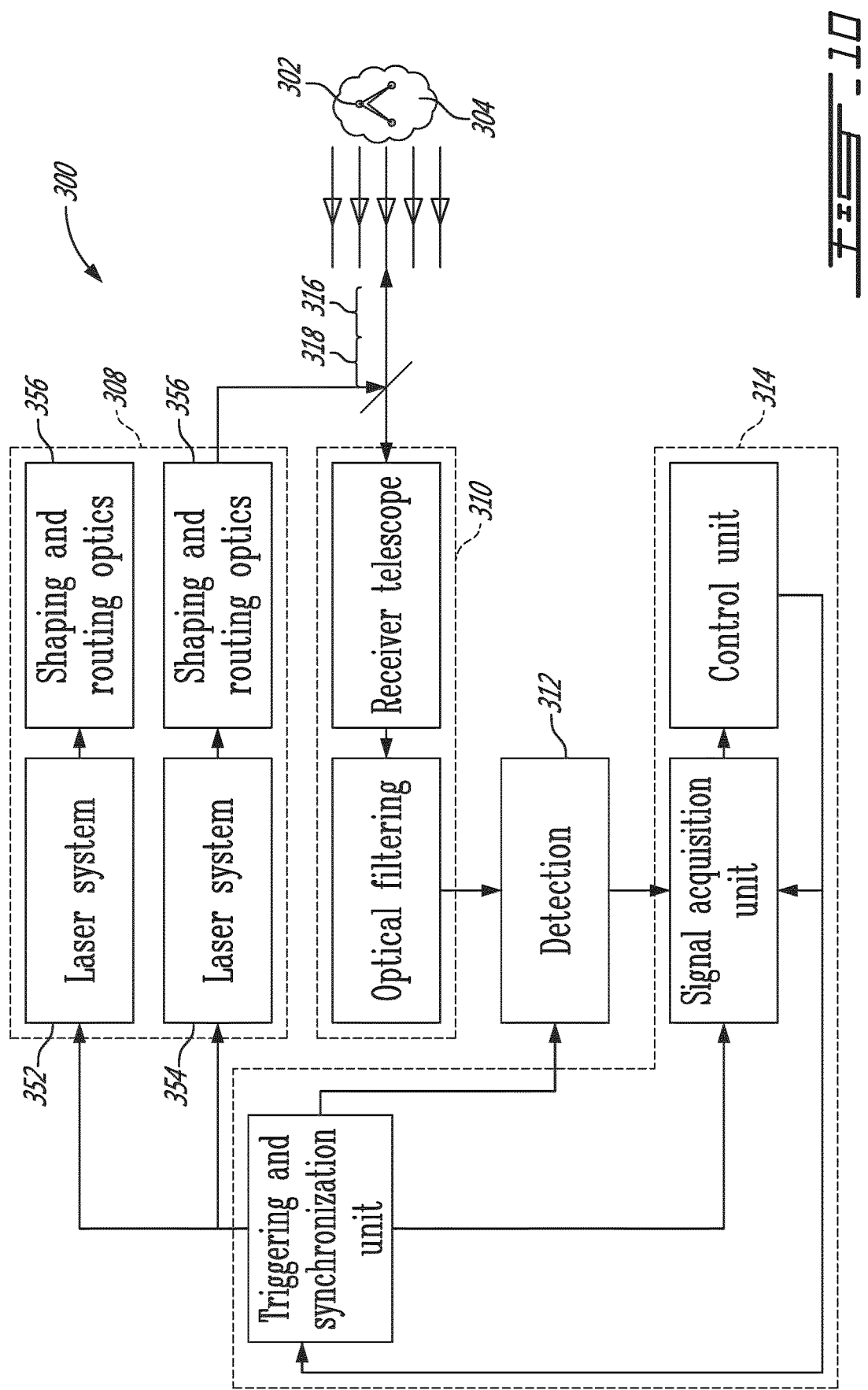
FIG. 10 is a schematic view of another example of a system for determining a concentration of a molecule having a Raman resonance in a scene, shown with first and second radiation generators, in accordance with an embodiment.

FIG. 10 shows another example of a system 300 for determining a concentration of a molecule 302 in a sample 304, in accordance with an embodiment. Similar elements bear similar reference numbers, but in the 300 series. As depicted, the system 300 has a radiation generator 308, a receiving assembly 310, an intensity detector 312 and a computer 314. It will be understood that in some embodiments, the concentration of the molecule 302 in the sample 304 determined by the system 300 may be a range-resolved concentration.

In this embodiment, the radiation generator 308 has a first radiation generator 352 adapted to generate the first radiation beam 316 and a second radiation generator 354 adapted to generate the second radiation beam 318. In this case, each one of the first radiation generator 352 and the second radiation generator 354 has its corresponding shaping and routing optics 356.

The first radiation generator 352 and the second radiation generator 354 can be operated in an alternating manner so as to illuminate the sample 304 with successive first and second radiation beams 316 and 318.

Figure 11:
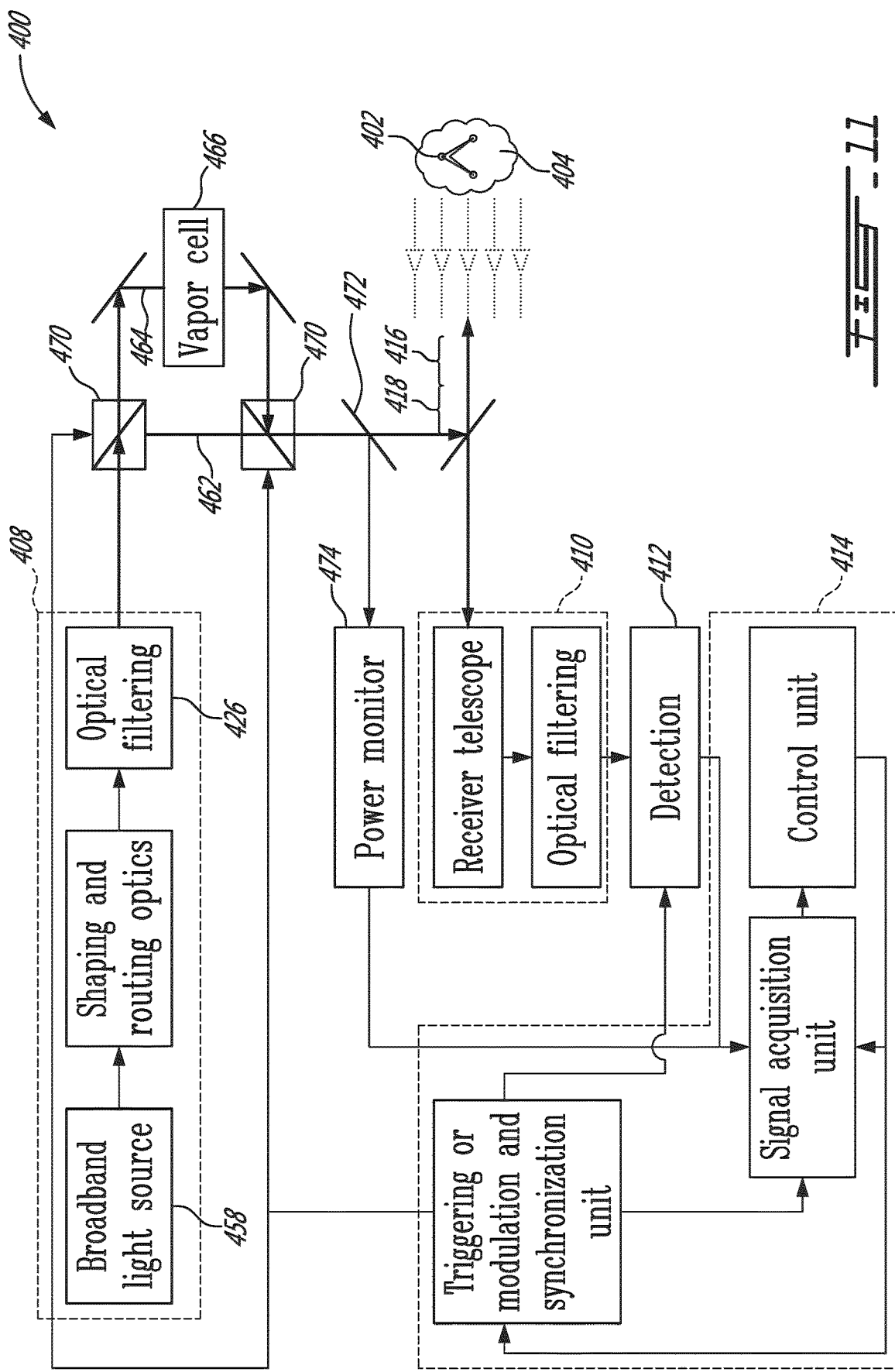
FIG. 11 is a schematic view of another example of a system for determining a concentration of a molecule in a scene, shown with a broadband radiation source, in accordance with an embodiment.

FIG. 11 shows another example of a system 400 for determining a concentration of a molecule 402 in a sample 404, in accordance with an embodiment. Similar elements bear similar reference numbers, but in the 400 series. As depicted, the system 400 has a radiation generator 408, a receiving assembly 410, an intensity detector 412 and a computer 414. The concentration determined by the system 400 may be a range-resolved concentration in some embodiments.

Figure 12:
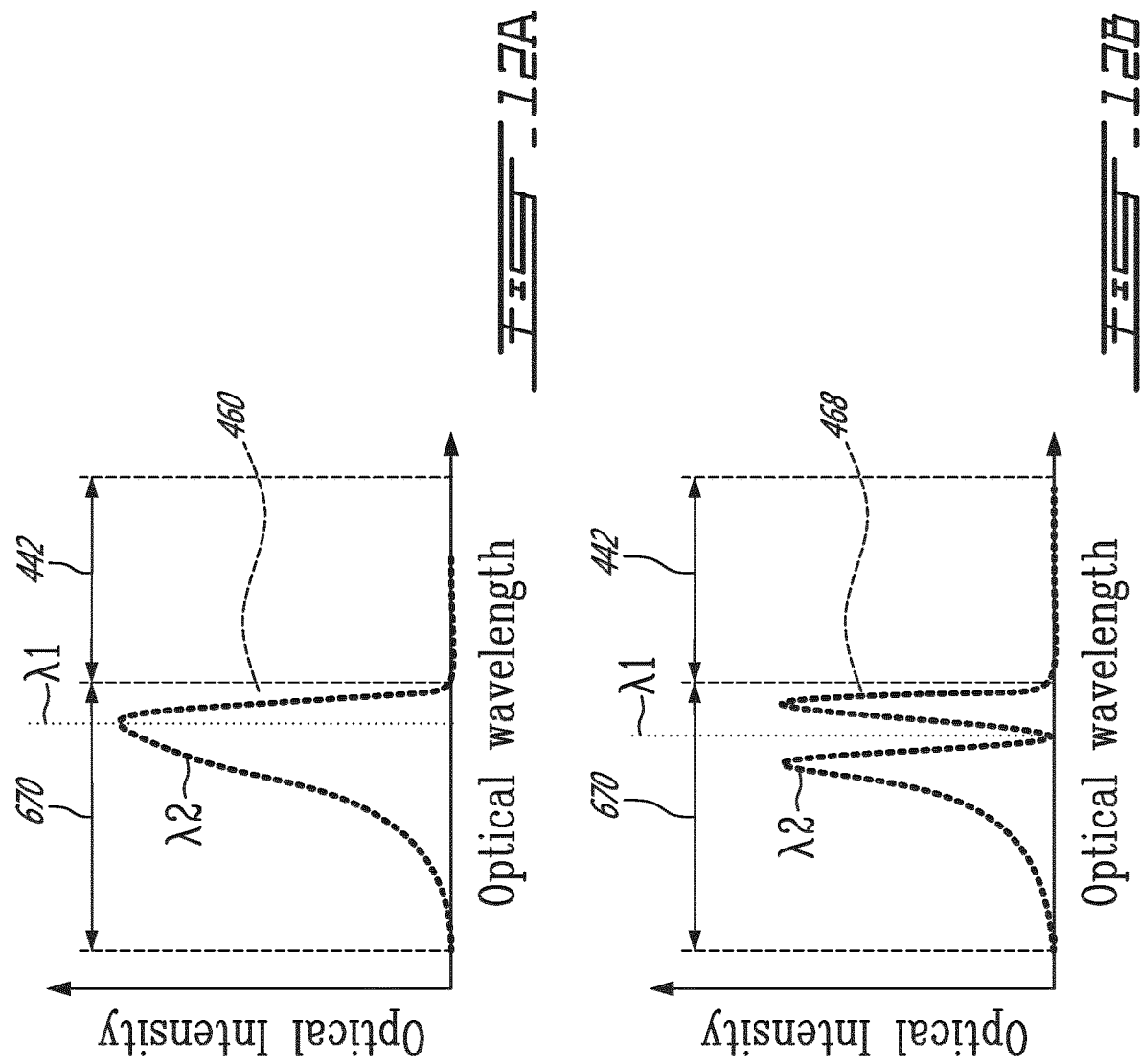
FIG. 12A is a graph showing an example of an optical spectrum of a first broadband radiation beam as emitted by the broadband source of FIG. 11, in accordance with an embodiment.
FIG. 12B is a graph showing an example of an optical spectrum of a second broadband radiation which corresponds to the first broadband radiation beam of FIG. 12A after propagation in a gas cell of the system of FIG. 11, in accordance with an embodiment.

In this embodiment, the radiation generator 408 includes a broadband radiation generator 458 adapted to generate the first radiation beam as a first broadband radiation beam 416. In this manner, the first broadband radiation beam 416 has the first excitation wavelength $\lambda 1$, but also wavelengths other than the first excitation wavelength $\lambda 1$. In other words, the first broadband radiation beam 416 includes substantial optical power value at many wavelengths, including the first excitation wavelength $\lambda 1$. FIG. 12A shows an example of a first optical spectrum 460 of the first broadband radiation beam 416.

The broadband radiation generator 458 can include coherent sources like lasers with linewidths larger than the Raman resonance features or incoherent sources such as LEDs.

The term broadband is used herein to characterize a radiation beam which has a bandwidth which is broader than a bandwidth of the Raman resonance. Accordingly, the bandwidth of the first broadband radiation beam 416, generated by the system of FIG. 11, is larger than a bandwidth of the Raman resonance to which the first radiation beam 416 is tuned to. In contrast, a radiation beam is not referred to as broadband when its linewidth is smaller than a bandwidth of the Raman resonance to which the radiation beam is tuned to.

In these embodiments, the system 400 includes a first beam path 462 along which the first broadband radiation beam 416 is propagated prior to illuminating the sample 404 therewith.

The system 400 also includes a second beam path 464, which passes in a gas cell 466 containing the molecule 402 of interest, along which the first broadband radiation beam 416 is propagated prior to illuminating the sample 404 therewith. The molecule 402 inside the gas cell 466 filters out the first excitation wavelength $\lambda 1$ from the first broadband radiation beam 416, as the Raman resonance of a molecule generally corresponds to one of its absorption wavelength, to provide a second broadband radiation beam 418. The gas cell 466 is optional and can be replaced by any other resonance filtering element that can mimic part of the absorption spectrum of the molecule of interest to filter out the one or more Raman resonances of molecule 402 from the second broadband radiation 418. The resonance filtering element can be in the form of a dielectric interference filter, a series of dielectric interference filters, a Fabry-Perot filter, a grating monochromator, a double or triple monochromator if multiple lines are to be filtered, Bragg gratings in fibers when fibers are used or any other suitable resonance filtering element or combination thereof.

As can be understood, the first broadband radiation beam 416 that is propagated along the second beam path 464 can be referred to as the second broadband radiation beam 418, as it lacks the first excitation wavelength $\lambda 1$ and has wavelengths, including the second excitation wavelength $\lambda 2$, other than the first excitation wavelength $\lambda 1$. Accordingly, the second broadband radiation beam 418, obtained by propagating the first broadband radiation beam 416 across the gas cell 466 containing the molecule 402, includes substantial optical power at many wavelengths, except the first excitation wavelength $\lambda 1$. FIG. 12B shows an example of a second optical spectrum 468 of the second radiation beam 418 as generated by the system 400 of FIG. 11.

To select which one of the first and second radiation beams 416 and 418 the sample 404 is illuminated with, electro-optic or mechanical switches 470 can be used to switch between the first path 462 and the second path 464.

The broadband radiation beam can be optically filtered by a first filter element 426 so that there is a minimum of source light in the Raman detection spectral band 442, as best seen in FIGS. 12A and 12B, for both broadband radiation beams 416 and 418. The optical filtering can be performed either before the optical paths are separated (switched by switches 470) or after the first and second broadband radiation beams 416 and 418 are combined to one another. In this embodiment, the broadband radiation beam is filtered before the paths are separated/switched to generate the first broadband radiation beam 416 and the second broadband radiation beam 418. This filtering could be done using interference filters or a grating monochromator, for example. The use of incoherent light, LEDs or lamps, may be suitable for a cost-efficient measurement system. Using this approach, it may not be necessary to stabilize the wavelength of the radiation source, although it is preferable, to some extent, to stabilize the optical spectrum for a well calibrated measurement.

It is envisaged that the first excitation wavelength λ1, in the case of a laser, can be stabilized using a laser optical frequency stabilization subsystem. An example of the laser optical frequency stabilization subsystem can include the gas cell 466 containing the molecule 402. If it is determined that the Raman resonance coincides with the absorption peak in the vapor phase, then a feedback scheme using absorption can be used to stabilize the wavelength. For example, the feedback scheme can involve splitting off part of the radiation beam using a beam splitter 472, after the two beam paths 462 and 464 are recombined to one another. In some embodiments, part of the common beam path can go directly to an auxiliary intensity detector 474 to measure the intensity of a portion of the first broadband radiation beam 416 and to measure the intensity of a portion of the second broadband radiation beam 418. It can be preferred that the ratio of these intensities remains constant. If not, the laser's optical frequency can be slightly changed to re-establish the ratio. In other techniques, the optical frequency is dithered using, for example, an acousto-optic modulator and an error signal can be fed back to an element in the laser's optical cavity.

Figure 13:
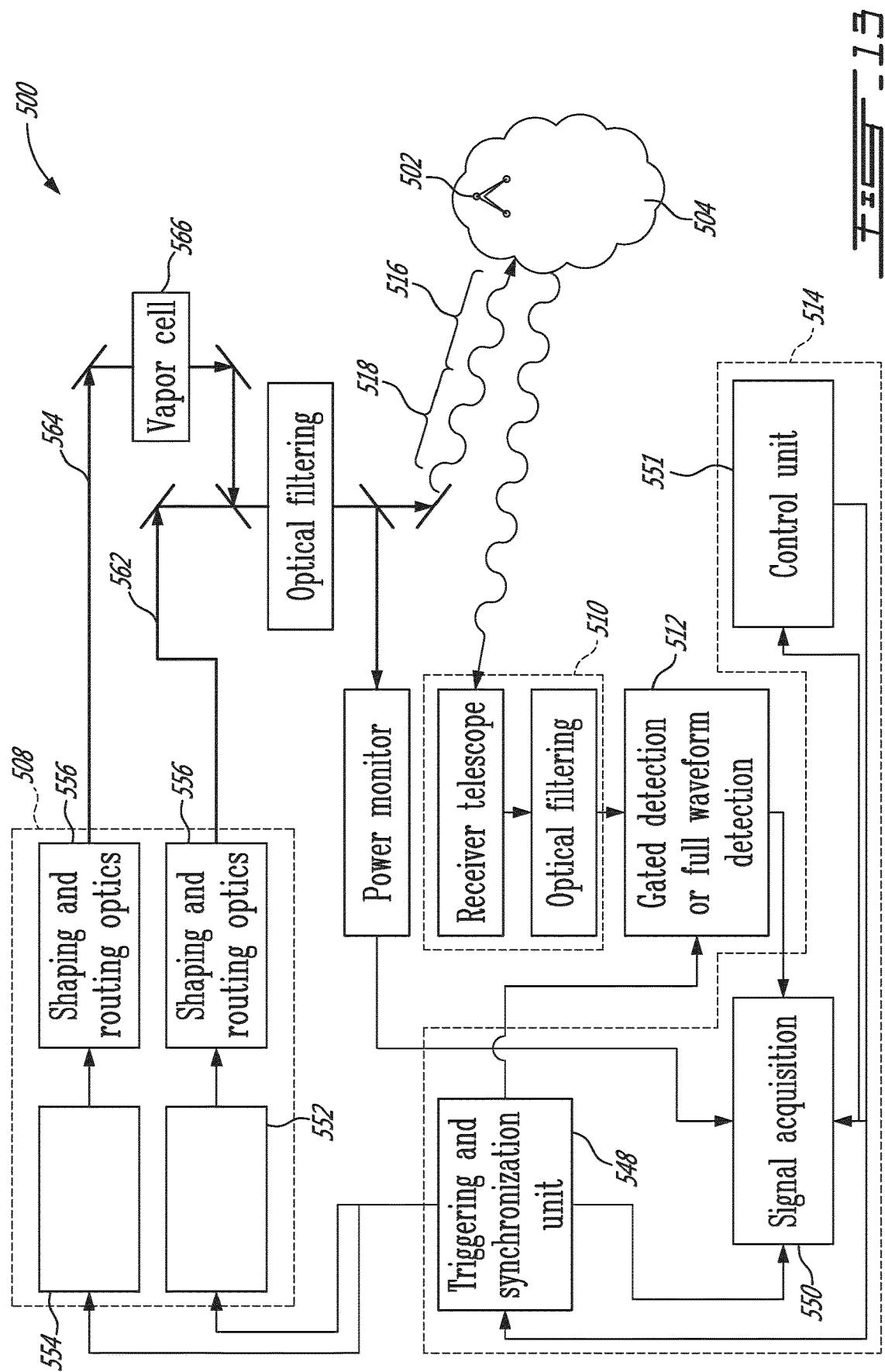
FIG. 13 is a schematic view of another example of a system for determining a concentration of a molecule in a scene, shown with first and second broadband radiation sources, in accordance with an embodiment.

FIG. 13 shows another example of a system 500 for determining a concentration of a molecule 502 in a sample 504, in accordance with an embodiment. Similar elements bear similar reference numbers, but in the 500 series. As depicted, the system 500 has a radiation generator 508, a receiving assembly 510, an intensity detector 512, a computer 514 and a gas cell 566. The concentration determined by the system 500 may be a range-resolved concentration in some embodiments or be of the path-integrated type in some other embodiments.

In this embodiment, the radiation generator 508 has a first broadband radiation generator 552 adapted to generate the first broadband radiation beam 516 and a second broadband radiation generator 554 adapted to generate the second broadband radiation beam 518. In this embodiment, each of the first and second broadband radiation generators 552 and 554 has its corresponding shaping and routing optics 556.

As shown, the first broadband radiation beam 516 is propagated along a first path 562 exiting from the first broadband radiation generator 552 and the second broadband radiation beam 518 is propagated along a second path 564 passing in the gas cell 566 containing the molecule 502. As can be understood, the first broadband radiation beam 516 can have an optical spectrum similar to that shown in FIG. 12A, whereas the second broadband radiation beam 518, once propagated in the gas cell 566, can have an optical spectrum similar to that shown in FIG. 12B.

The radiation generators 552 and 554 can be LEDs, broadband lasers, broadband lamps or any other broadband radiation generator. Examples of UV broadband radiation generators are frequency doubled broadband dye lasers or broadband optical parametric oscillators (OPOs). Other examples of broadband radiation generators are superluminescent diodes (SLDs) that are essentially laser diodes that have one facet coated with an anti-reflection coating keeping the diode from being a laser oscillator but still emitting "laser like" light, but with a broad optical spectrum. Still another example of broadband radiation generators are LEDs, of interest because of their very low cost. Still another example of broadband radiation generators are lamps, such as xenon arc lamps or deuterium lamps. Lamps could be of interest for very deep UV resonance, where other types of radiation generators are not available. These radiation generators would be modulated in the required format for the method to work, being for range resolved embodiments or other types of embodiments.

In another range resolved embodiment, the first and second broadband radiation generators 552 and 554 can be pulsed LEDs or SLDs, where the LEDs or SLDs are pulsed using a pulsed current driver. The current pulse can be of the order of 10 ns or less to allow a spatial resolution along the beam path of approximately 1.5 meters in air. In this case, the LEDs or SLDs emit a spectrally broadband pulse of light having a pulse duration of 10 ns. There can be one or more optical elements, such as a lens, in front of the LEDs or SLDs for beam forming purposes.

In another range resolved embodiment, the first and second broadband radiation generators 552 and 554 can be a pulsed laser, such as a dye laser pumped by the harmonic of a Q-switched Nd:YAG laser or equivalent and then frequency double to the UV. The dye laser can be replaced by a solid state optical parametric oscillator. Another example of a pulsed laser is a pulsed Ytterbium doper fiber laser, the infrared output of which is frequency quadrupled to the UV. The pulse can be of the order of 10 ns or less to allow a spatial resolution along the beam path of approximately 1.5 meters in air. In this case, the laser emits a spectrally broadband pulse of light having a pulse duration of 10 ns or less. There can be one or more optical elements, such as a lens, in front of the laser for beam forming purposes.

In some embodiments, the radiation generators can be UV LEDs or SLDs depending on the Raman resonance of the molecule. The LEDs can emit a broadband signal having center wavelengths ranging from 230 nm to more than 400 nm. The LEDs can be purchased from any suitable LED supplier, such as Crystal IS from Green Island, N.Y., United States, or Nichia from Tokushima, Japan for UV LEDs. Examples of LEDs include those from Sensor Electronic Technology Incorporated (SETI) from Columbia, S.C., United States. Full widths at half maximum (FWHM) are typically 12 nm to 15 nm.

As the LEDs emit light over almost 180°, covering a whole hemisphere, a portion of the light can be lost when the sample 504 is illuminated using the system 500. Therefore, using the LEDs with the purposes of illuminating or ranging in a limited field of view can reduce the overall wall plug efficiency of the illuminating or ranging light source (what is outputted by the illuminating or ranging system). Even though the LED light generally may not travel in the form of a small low divergence light beam as can be done with lasers, more directional LEDs are in development.

In the illuminated scene or open path case, the measurement can be with any form of modulation when the measurement is of the path integrated type, i.e. not range-resolved, where the average concentration measured is that of the molecule 502 of interest all along the path of the first and second broadband radiation beams 516 and 518. When working in the solar blind spectral region on earth, ambient light does not interfere with a measurement.

In the short pulsed radiation generator case illuminating a scene or a long open path, the measurement can be of the path integrated type, where the average concentration measured is that of the molecule 502 of interest all along the path of the first and second broadband radiation beams 516 and 518. The pulsed nature of the radiation generators are then of use in the generation of said radiation or in filtering out unwanted interfering light of a more continuous nature (such as sunlight or lighting).

In some embodiments with pulsed radiation generators, the intensity detector 512 is coupled to a high bandwidth circuit that follows the signal amplitude in time. For example, for 10 ns pulses, the bandwidth of the detection could be of 30 to 50 MHz. The intensity measurements are then digitized for post-processing. When illuminating a scene (e.g. a long open optical path), this is referred to as "full waveform LIDAR". The return waveform is measured for every emitted pulse. Emitting the light pulses from the radiation generators is synchronized with the detection. The time between the emission and the detection is monitored in order to know from where the first and second return signals originate. Post-processing can include waveform averaging, when emitted pulse energies are less than 1 µJ.

In the case of the short pulse implementation, the first and second return signals can be in the form of a light pulse when it originates from a small volume along a given path of the first and second broadband radiation beams 516 and 518 (e.g., a small cloud of molecules of interest, or from molecules in liquid or solid from on a surface). There can be first and second return signals all along the given path or particulates that absorb and emit Raman light all along the given path. If there are changes in density of the molecule 502 along the given path, as when there is a cloud, it can be measurable as a change in the first and second intensities measured by the intensity detector 512.

In some embodiments, it is intended that by the modulating or pulsing of the LEDs, one may use a lighting fixture, a LED indicator, or a cell phone flash, and turn it into a sensor or LIDAR. In this case, some lighting fixtures can have a dual use such that some lighting fixtures come in the form of an ensemble of LEDs of different colors, whereas some of these LEDs can be used as the broadband radiation generator of a system for determining a concentration or a range-resolved concentration of the molecule 502 in the sample 504 when combined with the appropriate emission filters and appropriate receiver. LEDs can also be added to existing lighting, indicators, cell phones and the like, e.g., deep UV LEDs, and modulated or pulsed only when required.

In alternate embodiments, the first excitation wavelength $\lambda 1$ of the first radiation beam can be tuned to the fluorescence resonance of the molecule instead of being tuned to the Raman resonance of the molecule. These two often coincide with an absorption resonance when in the gas phase.

In these embodiments, a method for determining the presence of a molecule having a fluorescence resonance can be performed. The method includes the following steps. A step of illuminating a sample with a first broadband radiation beam, the first broadband radiation beam having a first excitation wavelength being tuned to a fluorescence resonance of the molecule. A step of receiving a first return signal from the sample following illumination of the sample with the first broadband radiation beam. A step of measuring a first intensity of the first return signal using an intensity detector. A step of propagating a broadband radiation beam into a cell containing the molecule and obtaining a second broadband radiation beam lacking the first excitation wavelength and having wavelengths other than the first excitation wavelength. A step of illuminating the sample with the second broadband radiation beam. A step of receiving a second return signal from the sample following illumination of the sample with the second broadband radiation beam. A step of measuring a second intensity of the second return signal using an intensity detector. A step of determining the presence of the molecule in the sample when the first intensity and the second intensity are indicative of a fluorescence resonance interaction between the first broadband radiation beam and the molecule. Everything that has been described above in relation with Raman resonances with broadband radiation sources may apply to fluorescence resonances, both in methods and systems. This includes the modulation format of the source or sources, the type of radiation generators, the interaction with the sample (locally or in a scene), range resolved or not, the receiver and the processing.

In these embodiments, the cell can be replaced by any other resonance filtering element that can mimic part of the absorption spectrum of the molecule of interest. The resonance filtering element can be in the form of a dielectric interference filter, a series of dielectric interference filters, a Fabry-Perot filter, a grating monochromator, a double or triple monochromator if multiple lines are to be filtered, Bragg gratings in fibers when fibers are used or any other suitable resonance filtering element or combination thereof.

It is intended that the systems 400 and 500 described with respect to the Raman resonance interaction can also be used for performing the method. Indeed, both light-matter interactions are excitable and observable at different wavelengths (i.e. the excitation wavelength and the emission wavelength). The Raman resonance and the fluorescence resonance thus constitute light-matter interactions which are alike one another, in contrast with absorption, wherein the light-matter interaction is both "excitable" and observable at the same wavelength.

In these embodiments, the second filter element can be designed to filter out wavelengths other than wavelengths comprised in one or more predetermined fluorescence detection spectral bands. As can be understood, in these embodiments, the presence of the molecule can be determined when the first and second intensities are indicative of a fluorescence resonance interaction between the first radiation beam and the molecule.

In other alternate embodiments, the first excitation wavelength $\lambda 1$ of the first radiation beam can be tuned to an absorption wavelength of the molecule instead of being tuned to either one of the Raman resonance and the fluorescence resonance of the molecule.

In these embodiments, a method for determining a range-resolved concentration of a molecule in a scene can be performed. The method includes the following steps. A step of illuminating the scene with a first pulsed broadband radiation beam using one or more LEDs, the first pulsed broadband radiation beam having a first wavelength being tuned to an absorption wavelength of the molecule. A step of receiving a first return signal from the scene following illumination of the scene with the first pulsed broadband radiation beam. A step of measuring a first intensity of the first return signal using an intensity detector. A step of propagating a pulsed broadband radiation beam into a cell containing the molecule and obtaining a second pulsed broadband radiation beam lacking the first wavelength and having wavelengths other than the first wavelength. A step of illuminating the scene with the second pulsed broadband radiation beam. A step of receiving a second return signal from the scene following illumination of the scene with the second pulsed broadband radiation beam. A step of measuring a second intensity of the second return signal using an intensity detector, wherein the steps of illuminating and measuring are synchronized with one another, allowing a step of determining a concentration value of the molecule for at least one range value in the scene based on the first intensity and on the second intensity.

In these embodiments, the cell can be replaced by any other absorption filtering element that can mimic part of the absorption spectrum of the molecule of interest. The absorption filtering element can be in the form of a dielectric interference filter, a series of dielectric interference filters, a Fabry-Perot filter, a grating monochromator, a double or triple monochromator if multiple lines are to be filtered, Bragg gratings in fibers when fibers are used or any other suitable absorption filtering element or combination thereof.

It is intended that the systems 400 and 500 described with respect to the Raman resonance interaction can also be used for performing such method when the radiation generators are pulsed LEDs. However, in these embodiments, the second filter element can be designed to filter out wavelengths other than wavelengths comprised in a predetermined absorption detection spectral band, which is generally centered on the selected absorption wavelength, as shown at 670 in FIGS. 12A and 12B. As can be understood, in these embodiments, the presence of the molecule can be determined when the first and second intensities are indicative of an absorption interaction between the first radiation beam and the molecule.

The LEDs can emit a broadband signal having center wavelengths ranging from 230 nm to more than 7000 nm. The LEDs can be purchased from any suitable LED supplier, such as Crystal IS from Green Island, N.Y., United States, or Nichia from Tokushima, Japan for UV LEDs, or LED Microsensor NT from Saint-Petersburg, Russia for mid-infrared LEDs.

Full widths at half maximum (FWHM) are typically 12 nm at 255 nm. FWHM rise with wavelength. In the far infrared, FWHM could be as large as 900 nm at 5000 nm. FWHM thus typically vary between 4% and 20% of the center wavelength value.

Thanks to the synchronisation unit 548, the signal acquisition unit 550 and the control unit 551 of the system 500 shown in FIG. 5, a first measurement can be done with a gate delay which corresponds to a distance d1 (d1 can be zero, or a measurement of the emitted light). The measurement, in this case, is an intensity as measured through the intensity detector 512. A second measurement can be done at a second gate delay, which can correspond to a distance d2, greater than the distance d1. The computer 514 can then perform a ratio between the intensity measured at d2 and the one measured at d1. This can give an absorption/attenuation spectrum indicative of the average concentration of the molecule 502 of interest between d1 and d2 through computations known in the art.

In this case, the measurement can be of the path integrated type, where the average concentration measured is that of the molecule 502 of interest all along the path of the first and second broadband radiation beams 516 and 518.

The first and second return signals can be in the form of a light pulse when it originates from a small volume along a given path of the first and second broadband radiation beams 516 and 518 (e.g., a small cloud of molecules of interest, or from a liquid or solid on the a surface). There can be first and second return signals all along the given path or particulates that absorb all along the given path. If there are changes in density of the molecule 502 along the given path, as when there is a cloud, it can be measurable as a change in the first and second intensities measured by the intensity detector 512.

In some embodiments, it is intended that by pulsing of the LEDs, one may use a lighting fixture, a LED indicator, or a cell phone flash, and turn it into a LIDAR. In this case, some lighting fixtures can have a dual use such that some lighting fixtures come in the form of an ensemble of LEDs of different colors, whereas some of these LEDs can be used as the broadband radiation generator of a system for determining a range-resolved concentration of the molecule 502 in the sample 504 when combined with the appropriate emission filters and appropriate receiver. LEDs can also be added to existing lighting, indicators, cell phones and the like, e.g., deep UV LEDs, and pulsed only when required.

Figure 14:
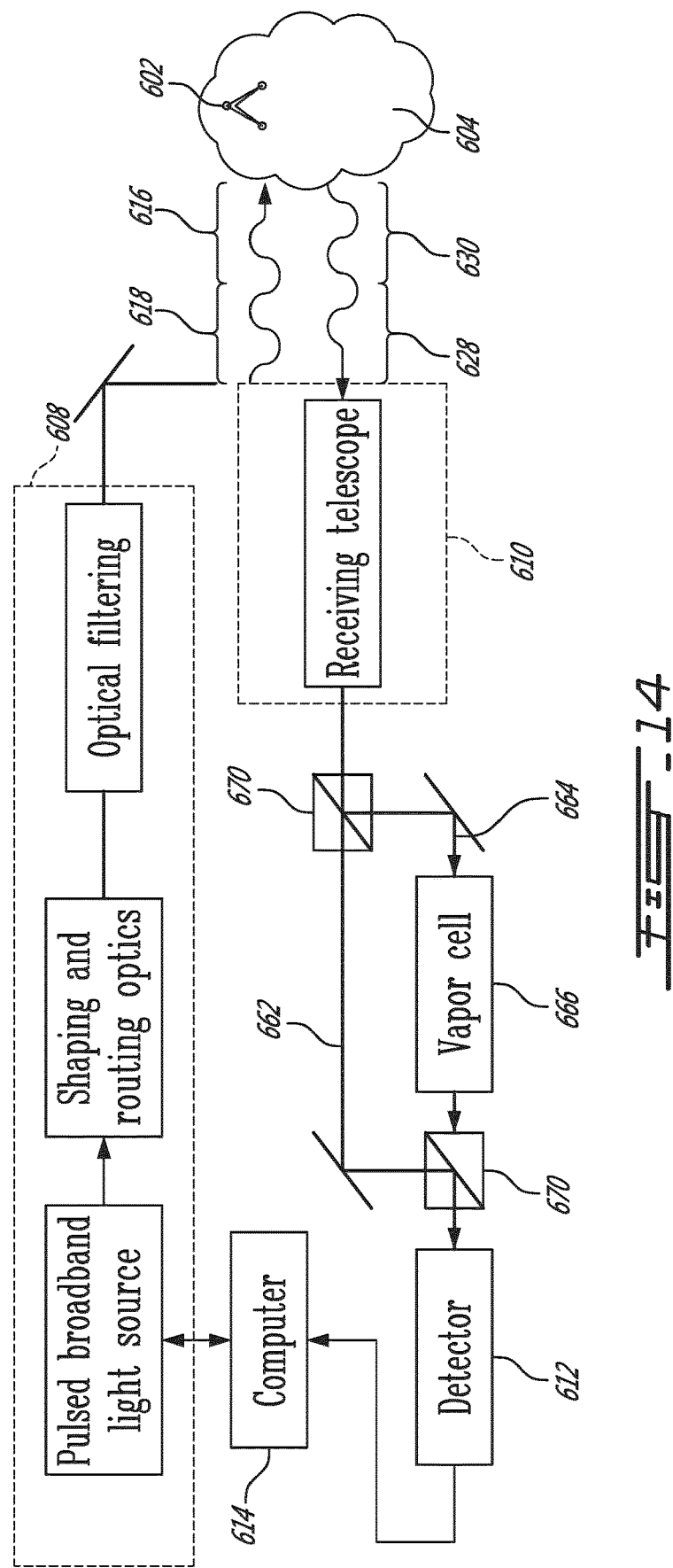
FIG. 14 is a schematic view of another example of a system for determining a range-resolved concentration of a molecule in a scene, shown with two optical paths in a receiving assembly of the system, in accordance with an embodiment.

FIG. 14 shows another example of a system 600 for determining a range-resolved concentration of a molecule 602 in a scene 604, in accordance with an embodiment. Similar elements bear similar reference numbers, but in the 600 series. As depicted, the system 600 has a radiation generator 608, a receiving assembly 610, an intensity detectors 612 and a computer 614.

As shown, the radiation generator 608 includes one or more LEDs to illuminate the scene 604 with a pulsed broadband radiation beam comprised of a first pulsed broadband radiation beam 616 and comprised of a second pulsed broadband radiation beam 618.

The receiving assembly 610 is adapted to receive first and second return signals 628 and 630 from the scene 604 following illumination of the scene 604 with a corresponding one of the first and second pulsed broadband radiation beams 616 and 618. The first return signal 628 is propagated along a first path 662 whereas the second return signal 630 is propagated along a second path 664.

As shown in this example, a gas cell 666 is configured to filter out the absorption wavelength of the molecule 602 from the second return signal 630, which is propagated along the second path 664.

As shown, the system 600 is similar to the system 400 of FIG. 11, except that the first path 662, the second path 664, the gas cell 666 and the electro-optic or mechanical switches 670 are provided between the receiving assembly 610 and the intensity detector 612. As can be understood, the electro-optic or mechanical switches 670 can be used to switch between the first path 662 and the second path 664, prior to the intensity detector 612.

It can thus be understood from the embodiments described with reference to FIGS. 11 and 14 that the absorption filtering element (e.g., a gas cell containing the molecule) can be used to filter out the absorption wavelength from either the second pulsed radiation beam or the second return signal.

In another embodiment, the electro-optic or mechanical switches 670 can be omitted by providing a dedicated intensity detector to each one of the first and second paths.

It will be understood that the expression "computer" as used herein is not to be interpreted in a limiting manner. It is rather used in a broad sense to generally refer to the combination of some form of one or more processing units and some form of memory system accessible by the processing unit(s). A computer can be a personal computer, a smart phone, an appliance computer, etc.

It will be understood that the various functions of the computer, or more specifically of the processing unit or of the memory controller, can be performed by hardware, by software, or by a combination of both. For example, hardware can include logic gates included as part of a silicon chip of the processor. Software can be in the form of data such as computer-readable instructions stored in the memory system. With respect to a computer, a processing unit, a memory controller, or a processor chip, the expression "configured to" relates to the presence of hardware, software, or a combination of hardware and software which is operable to perform the associated functions.

As can be understood, the examples described above and illustrated are intended to be exemplary only. In some embodiments, the receiving assembly can have a first receiving assembly adapted to receive a first return signal as well as a second receiving assembly adapted to receive a second return signal, for example with the LED absorption LIDAR having the gas cell in one the receiving paths instead of one of an emission path. In some other embodiments, the intensity detector can have a first intensity detector adapted to measure the first intensity of the first return signal as well as a second intensity detector adapted to measure the second intensity of the second return signal. The laser source can be a pulsed laser source and, accordingly, the first and second radiation beams can be pulsed laser beams. It is understood that the computer can monitor which one of the first and second radiation beams illuminates the scene at any given moment in time. Additionally, the computer can also monitor which radiation generator, or which wavelength, illuminates the scene at any given moment in time. Such monitoring can help operate the corresponding system in a synchronized manner allowing concentration measurements to be performed. The systems described above can be hand-portable in some embodiments, whereas they can be mountable to a vehicle such as a car, a truck, an aircraft or to any suitable type of vehicle in some other embodiments. The systems can even be used on unmanned aerial vehicles due to their small footprint, low weight and reduced power consumption. In alternate embodiments, the radiation generator, the intensity detector can be remote from the emission and collection optics. In these embodiments, the radiation generator can be coupled to a fiber or fiber bundle that routes the first and second radiation beams to the emission optics and similarly, a fiber or fiber bundle can route the first and second return signals collected by the collection optics to the intensity detector. Optical filters can be placed at the input or output of the fibers or fiber bundles. This may be useful when the optical head containing only optics is to be placed in a potentially explosive environment. It could also be useful when using systems described above on a tethered unmanned aerial vehicle, where weight can be a critical parameter. The scope is indicated by the appended claims.

What is claimed is:

1. A method for determining the presence of a molecule in a sample, the method comprising the steps of:
   a) selecting a Raman resonance of the molecule from an optical absorption spectrum of the molecule;
   b) illuminating the sample with a first radiation beam, the first radiation beam having a first excitation wavelength being tuned to the selected Raman resonance of the molecule;
   c) receiving a first return signal from the sample following illumination of the sample with the first radiation beam, the first return signal being received within a detection spectral band encompassing given Raman scattering features of the molecule;
   d) measuring a first intensity of the first return signal using an intensity detector;
   e) illuminating the sample with a second radiation beam, the second radiation beam lacking the first excitation wavelength and having a second excitation wavelength being different from the first excitation wavelength, the second excitation wavelength being close to the first excitation wavelength so that the given Raman scattering features of the molecule are encompassed within the detection spectral band upon illumination of the sample with the second radiation beam;
   f) receiving a second return signal from the sample following illumination of the sample with the second radiation beam, the second return signal being received within the detection spectral band;
   q) measuring a second intensity of the second return signal using an intensity detector; and
   h) determining that the molecule is present in the sample when a difference between the first intensity and the second intensity exceeds a given threshold, the difference being indicative of a Raman resonance interaction that occurred between the first radiation beam and the molecule.

2. The method of claim 1 wherein said illuminating the sample with the first radiation beam includes generating the first radiation beam with a first radiation generator and wherein said illuminating the sample with the second radiation beam includes generating the second radiation beam with a second radiation generator.

3. The method of claim 1 wherein said illuminating the sample with the first radiation beam includes generating the first radiation beam at the first excitation wavelength using a tunable radiation generator and wherein said illuminating the sample with the second radiation beam includes tuning the tunable radiation generator to generate the second radiation beam at the second excitation wavelength.

4. The method of claim 1 wherein said illuminating the sample with the first radiation beam includes generating a broadband radiation beam and illuminating the sample with the broadband radiation beam and wherein illuminating the sample with the second radiation beam includes filtering out the first excitation wavelength from the broadband radiation beam and illuminating the sample with the filtered broadband radiation beam.

5. The method of claim 4 wherein said filtering out includes propagating the broadband radiation beam into a gas cell containing the molecule.

6. The method of claim 4 wherein said generating a broadband radiation beam includes generating the broadband radiation beam with one or more light-emitting diodes (LEDs).

7. The method of claim 1 wherein said determining includes determining a concentration of the molecule in the sample.

8. The method of claim 1 wherein the steps of illuminating and measuring are synchronized with one another, allowing determining a range resolved concentration of the molecule in the sample.

9. A system for determining the presence of a molecule in a sample, the system comprising:
   a) a housing;
   b) at least one radiation generator mounted to the housing and adapted to illuminate a sample with a first radiation beam, the first radiation beam having a first excitation wavelength being tuned to a Raman resonance of the molecule, and adapted to illuminate the sample with a second radiation beam, the second radiation beam lacking the first excitation wavelength and having a second excitation wavelength being different from the first excitation wavelength;

c) at least one receiving assembly mounted to the housing and adapted to receive first and second return signals from the sample following illumination of the sample with a corresponding one of the first and second radiation beams, the receiving assembly having a detection spectral band encompassing given Raman scattering features of the molecule when the sample is illuminated by either one of the first and second radiation beams;

d) at least one intensity detector mounted to the housing and adapted to measure a first intensity of the first return signal and a second intensity of the second return signal; and e) a computer communicatively coupled to the at least one intensity detector and configured to determine that the molecule is present in the sample when a difference between the first intensity and the second intensity exceeds a given threshold, the difference being indicative of a Raman resonance interaction that occurred between the first radiation beam and the molecule.

10. The system of claim 9 wherein the at least one radiation generator includes a broadband radiation generator for generating the first radiation beam as a broadband radiation beam, the system further comprising a first beam path along which the broadband radiation beam is propagated, a second beam path along which the broadband radiation beam is propagated, and a resonance filtering element mounted to the housing, in which the second beam path passes, the resonance filtering element filtering out the first excitation wavelength from the broadband radiation beam and obtaining the second radiation beam.

11. The system of claim 10 wherein the broadband radiation generator includes one or more light-emitting diodes (LEDs).

* * * * *